US012425460B2

(12) United States Patent
Akkil et al.

(10) Patent No.: US 12,425,460 B2
(45) Date of Patent: Sep. 23, 2025

(54) CONTENT TRANSFER AMONG REMOTE-CONTROL UNITS AND INTEGRATED OUTPUT DEVICES

(71) Applicant: Merlyn Mind, Inc., New York, NY (US)

(72) Inventors: Deepak Akkil, Helsinki (FI); Prasenjit Dey, Kolkata (IN); Ravindranath Kokku, Yorktown Heights, NY (US); Shom Surendran Ponoth, Irvine, CA (US); Hélène Irene Alonso, New York, NY (US); Sean O'Hara, Fort Montgomery, NY (US); Satya V. Nitta, Cross River, NY (US)

(73) Assignee: MERLYN MIND, INC., New York, NY (US)

( * ) Notice: Subject to any disclaimer, the term of this patent is extended or adjusted under 35 U.S.C. 154(b) by 0 days.

(21) Appl. No.: 18/331,024

(22) Filed: Jun. 7, 2023

(65) Prior Publication Data
US 2024/0291874 A1   Aug. 29, 2024

(30) Foreign Application Priority Data
Feb. 23, 2023   (IN) .............................. 202341012414

(51) Int. Cl.
*H04L 65/1089*   (2022.01)
*G06F 3/14*   (2006.01)
*H04L 65/1069*   (2022.01)

(52) U.S. Cl.
CPC ........ *H04L 65/1089* (2013.01); *G06F 3/1454* (2013.01); *H04L 65/1069* (2013.01)

(58) Field of Classification Search
CPC ............. H04L 65/1089; H04L 65/1069; H04L 65/1095; H04L 65/1094; H04L 65/1093;
(Continued)

(56) References Cited

U.S. PATENT DOCUMENTS 7,023,979 B1 *   4/2006   Wu ..................... H04M 3/5233
                                                              379/265.11
7,548,246 B2      6/2009   Huang et al.
(Continued)

FOREIGN PATENT DOCUMENTS

CN   111968360 A   11/2020

OTHER PUBLICATIONS

U.S. Appl. No. 18/073,942, Final Office Action, Apr. 5, 2024.
U.S. Appl. No. 18/073,938, Notice of Allowance, Oct. 11, 2024.

*Primary Examiner* — Ninos Donabed
(74) *Attorney, Agent, or Firm* — Duane Morris LLP

(57) ABSTRACT

A method performed by a remote-control unit (RCU) of managing a content transfer to or from integrated output devices (IODs) in a physical room is disclosed. The content transfer involves moving application context of a computer application with which a user can interact, which includes a computer object being operated on and relevant metadata. The RCU is programmed to recognize simple user instructions for the content transfer and perform the content transfer from a source device to a target device in real time, regardless of data transfer protocols specific to computer applications. Specifically, the RCU is programmed to obtain source data from the source device, generate updated source data by combining the source data with one or more commands specifying how the source data is to be handled based on a session mode indicating a type of activity being performed in the physical room, and transmit the updated source data to the target device for further user interaction.

20 Claims, 12 Drawing Sheets

(58) Field of Classification Search
CPC . H04L 65/1104; H04L 65/1016; H04L 65/80; H04L 65/403; H04L 65/1101; H04L 65/1073; G06F 3/1454; G06F 3/1423
See application file for complete search history.

(56) References Cited

U.S. PATENT DOCUMENTS

| | | | |
|---|---|---|---|
| 8,713,614 B2 | 4/2014 | Dodd | |
| 9,525,736 B2 | 12/2016 | Wang | |
| 9,542,007 B2* | 1/2017 | VanDuyn | H04N 21/4782 |
| 9,807,446 B2 | 10/2017 | Sirpal et al. | |
| 9,821,457 B1 | 11/2017 | Laurent et al. | |
| 9,934,679 B2 | 4/2018 | Liu et al. | |
| 10,311,714 B2 | 6/2019 | Huang et al. | |
| 10,332,516 B2 | 6/2019 | Shah et al. | |
| 10,490,062 B2* | 11/2019 | Neumann | G08C 17/02 |
| 2006/0004834 A1 | 1/2006 | Pyhalammi et al. | |
| 2007/0229465 A1 | 10/2007 | Sakai et al. | |
| 2009/0108680 A1* | 4/2009 | Minemura | H02J 9/005 |
| | | | 307/104 |
| 2010/0085208 A1* | 4/2010 | Murakoshi | G08C 19/16 |
| | | | 340/6.1 |
| 2010/0317332 A1 | 12/2010 | Bathiche et al. | |
| 2011/0191516 A1 | 8/2011 | Xiong et al. | |
| 2012/0274863 A1 | 11/2012 | Chardon et al. | |
| 2013/0321268 A1 | 12/2013 | Tuck et al. | |
| 2014/0181715 A1 | 6/2014 | Axelrod et al. | |
| 2015/0113567 A1 | 4/2015 | Scheer | |
| 2015/0382066 A1 | 12/2015 | Heeter et al. | |
| 2016/0127808 A1* | 5/2016 | Wong | H04Q 3/0087 |
| | | | 379/112.04 |
| 2017/0070767 A1 | 3/2017 | Heeter et al. | |
| 2017/0180567 A1* | 6/2017 | Sharma | H04M 15/8083 |
| 2018/0053402 A1* | 2/2018 | Woodard | G08C 17/02 |
| 2019/0312979 A1* | 10/2019 | Sharma | H04Q 3/0087 |
| 2021/0029872 A1* | 2/2021 | Brandt | A01D 34/008 |
| 2021/0342020 A1 | 11/2021 | Jorasch et al. | |
| 2021/0342785 A1* | 11/2021 | Mann | G06F 40/186 |
| 2021/0352478 A1* | 11/2021 | Hauser | H04W 12/068 |
| 2021/0373676 A1* | 12/2021 | Jorasch | G06F 3/038 |
| 2021/0382675 A1* | 12/2021 | Sharma | G06F 40/169 |
| 2022/0010523 A1* | 1/2022 | Izumikawa | E02F 3/439 |
| 2022/0360663 A1* | 11/2022 | Kempson | H04M 3/42306 |
| 2023/0083688 A1* | 3/2023 | Janakiraman | G06F 3/0482 |
| | | | 348/14.03 |
| 2023/0086906 A1* | 3/2023 | Tang | G06F 3/04842 |
| | | | 715/753 |

* cited by examiner

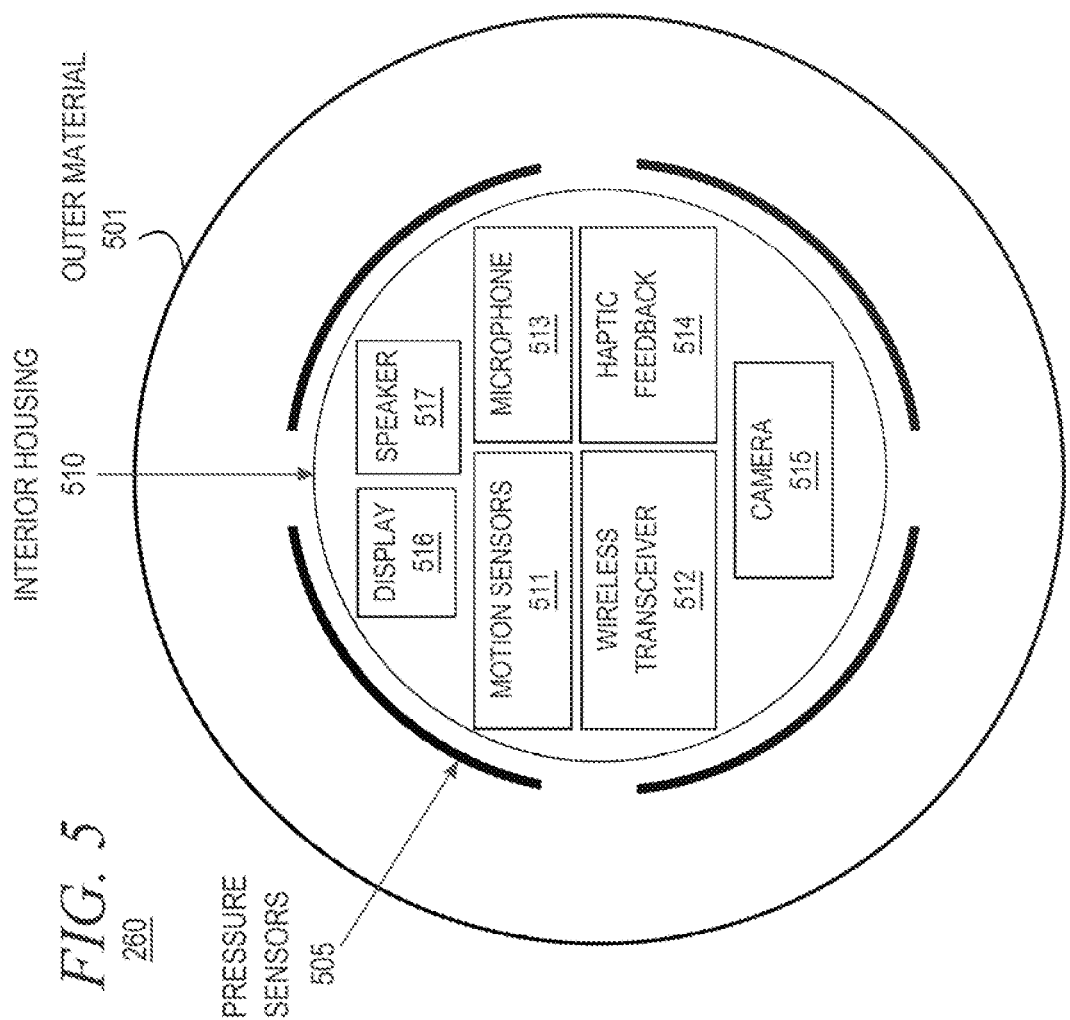

CONTENT TRANSFER AMONG REMOTE-CONTROL UNITS AND INTEGRATED OUTPUT DEVICES

BENEFIT CLAIM

This application claims priority benefit under 35 U.S.C. § 119 (a)-(d) to Indian Patent Application No. 202341012414 titled "CONTENT TRANSFER AMONG REMOTE-CONTROL UNITS AND INTEGRATED OUTPUT DEVICES" and filed Feb. 23, 2023, the entire contents of which are hereby incorporated by reference for all purposes as if fully set forth herein.

FIELD OF THE INVENTION

The present application relates to content transfer among devices. More specifically, the present application relates to seamless transfer of application context among remote-control units and integrated output devices in a physical room.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

In a modern physical classroom, electronic devices play an integral role in facilitating education activities, including input devices digitally capturing user expressions, processors processing user input and other data via different computer applications, and output devices presenting processing audio, images, or other multimedia in association with the computer applications. Some of these electronic devices may be integrated devices, which can integrate a process and an output device, for example. To control the electronic devices spread across the physical room, one or more remote-control units could be used, which are themselves often integrated devices. The education activities could be performed in various manners, involving different types of computer applications, device capabilities, users, locations, and so on. As the education activities are performed, it would be helpful to transfer application context of computer applications among the electronic devices conveniently and seamlessly, depending on the nature and requirements of the current education activities.

BRIEF DESCRIPTION OF THE DRAWINGS

The example embodiment(s) of the present invention are illustrated by way of example, and not in way by limitation, in the figures of the accompanying drawings and in which like reference numerals refer to similar elements and in which:

FIG. 5 is a diagram illustrating components of a remote-control unit having a specialized form factor in accordance with an illustrative embodiment.

DETAILED DESCRIPTION

Figure 1:
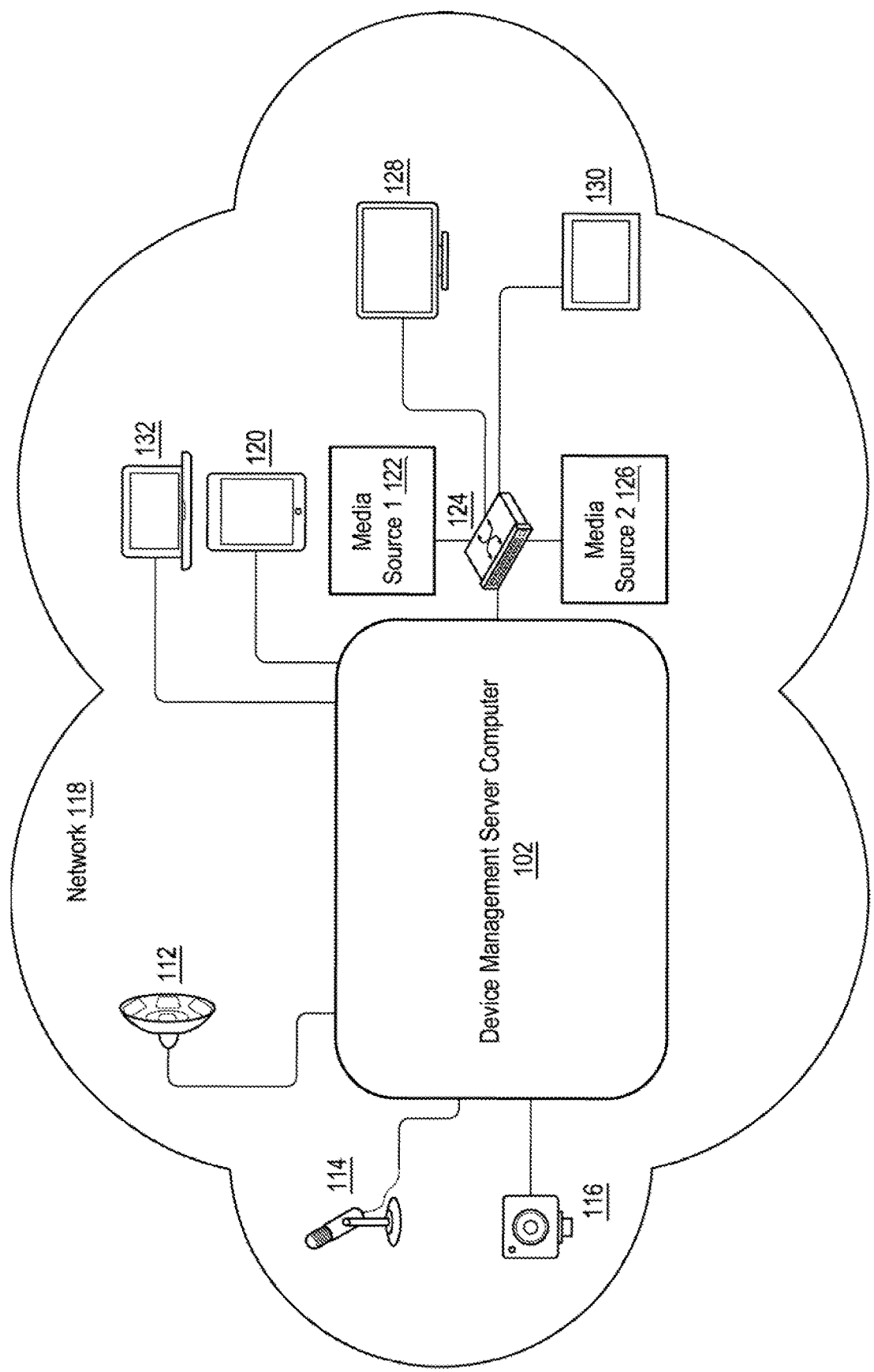
FIG. 1 illustrates an example networked computer system in which various embodiments may be practiced.

In the following description, for the purposes of explanation, numerous specific details are set forth in order to provide a thorough understanding of the present invention. It will be apparent, however, that the illustrative embodiments may be practiced without these specific details. In other instances, well-known structures and devices are shown in block diagram form in order to avoid unnecessarily obscuring the example embodiments.

Embodiments are described in sections below according to the following outline:
1. General Overview
2. Example Computing Environments
3. Example Computing Devices
4. Example Computing Components
5. Functional Descriptions
    5.1. User Management
    5.2. Device Pairing and Management
    5.3. Content Transfer Setup
    5.4. Source Data Processing
    5.5. Content Delivery and Integration
6. Example Procedures
7. Hardware Implementation
8. Extensions and Alternatives

1. General Overview

A method performed by a remote-control unit (RCU) of managing a content transfer to or from integrated output devices (IODs) in a physical room is disclosed. The content transfer involves moving application context of a computer application with which a user can interact, which includes a computer object being operated on and relevant metadata. The RCU is programmed to recognize simple user instructions for the content transfer and perform the content transfer from a source device to a target device in real time, regardless of data transfer protocols specific to computer applications. Specifically, the RCU is programmed to obtain source data from the source device, generate updated source data by combining the source data with one or more commands specifying how the source data is to be handled based on a session mode indicating a type of activity being performed in the physical room, and transmit the updated source data to the target device for further user interaction.

In some embodiments, a RCU is a relatively lightweight device compared to an IOD, which integrates an output device with a processor or a computing device to support various computer applications. The RCU, generally with limited processing and storage capabilities, may allow only a default set of computer applications to run or provide native support for certain types of computer objects, such as audio data or images. Otherwise, the RCU is used mainly to receive user instructions and perform specific processing, such as communicating with a user or the IODs, interpreting an instruction from a user, analyzing the data received from an IOD, or generating predetermined commands for handling the data using advanced computer applications.

In some embodiments, the RCU may be used by a user, such as a teacher, to control education activities in a physical classroom. The education activities can be in one of many session modes. For example, the session mode can be clarification, where the teacher monitors students working on assignments using their laptops at their desks, finds a student's work in need of clarification, and offers such clarification to share with all the students. The session mode can be collaboration, where the teacher waits for students working with public input/output (I/O) devices in groups and wants to provide a comparative analysis of the work products of the different groups. The session mode can be question and answer (Q&A), where the teacher first reviews specific questions presented by a public IOD and discusses answers presented by a different public IOD. The RCU is programmed to intelligently perform content transfers in accordance with the session mode, user instructions, and other factors.

In some embodiments, the RCU can have a set of user interface elements that enable a user to easily issue content transfer commands. For example, the user interface elements can include a single button such that pushing the button indicates initiating a content transfer and releasing the button indicates concluding a content transfer. The RCU is programmed to further interpret user instructions to identify a source device and a target device for the content transfer. For example, where the RCU is pointing or what the user then utters may be used to derive the source device or target device.

In some embodiments, the RCU is programmed to receive source data from an IOD as the source device for the content transfer. An IOD is generally programmed to send to the RCU application context for the active computer application running on the IOD, which can be a computer application not supported by the RCU. For example, a graphical calculator can be running on the IOD with a graphical user interface. The application context, which becomes the source data, can then include a computer object representing one or more mathematical formulas, state information indicating the portion of the computer object that was last accessed by a user, and an identifier of the active computer application, namely the graphical calculator. The content transfer is to enable users to continue interacting with the computer application on the target device. A IOD can also be programmed to send to the RCU backup source data constituting a capture of the output mechanism, which forms a computer object that can be handled by one of the default computer applications supported by the RCU. Such backup source data can be useful when the original source data fails to be properly handled by any target device or when the original source data is subject to further processing by a target device via the RCU.

In some embodiments, the RCU can be programmed to interpret further user instructions to update the source data using the backup source data. For example, the user could strike out a paragraph of a document on a screen capture of the document, and the RCU can be configured to then generate a command based on the user instruction. The RCU can be programmed to also automatically generate a command to update the source data by processing the backup source data. For example, the commands can be the result of scanning the screen capture for inappropriate text.

In some embodiments, the RCU is programmed to generate source data for the content transfer, thereby serving as the source device. For example, the RCU can be configured to take a photo of a screen of a student's laptop as the source data. The RCU can be configured to also directly update such source data or similarly generate a command to update the source data, as described above.

In some embodiments, the RCU is programmed to generate other commands based on the session mode, device data, or other factors. For example, the commands can specify installing or running a computer application or incorporating a computer object into an existing computer object being operated on by a computer application already running on a target device. The RCU is programmed to ultimately transmit updated source data, including one or more generated commands, to a target device. The target device is programmed to then interpret the commands and handle the computer object in the updated source data with an appropriate computer application to complete the content transfer.

The techniques discussed in this application have technical benefits. The techniques enable content transfer between devices across various computer applications without relying on data transfer protocols specific to the computer applications. An RCU can serve as an intermediary between IODs without the IODs communicating with each other directly based on those data transfer protocols. The RCU allows a user to easily issue content transfer instructions to improve the utilization of computer applications and multimedia data in a physical room, therefore improving usability and the efficiency of user-initiated content transfers. The RCU also provides a user with an opportunity to inspect and approve the content being transferred, thus improving the quality of the content being transferred. The techniques also enable automatic determination of how the content being transferred is to be handled by a target device based on the session mode indicating an activity being performed in the physical room, thus further enhancing the efficiency of the content transfer.

2. Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises a device management server computer 102 ("server") and an I/O system, including one or more integrated devices 132 and 120 which integrate input and output capabilities, a media switch 124, one or more input devices 114, 116, 122, and 126, and one or more output devices 112, 128, and 130. The server can be communicatively coupled with each component of the I/O system via one or more networks 118 or cables, wires, or other physical components.

In some embodiments, the server 102 broadly represents one or more computers, virtual computing instances, and/or instances of a server-based application that is programmed or configured with data structures and/or database records that are arranged to host or execute functions including but not limited to managing the I/O system, collecting action data, identifying compound actions, generating user interfaces for executing the compound actions, providing the user interfaces to a client device and/or causing execution of a compound action on one or more computer devices. In certain embodiments, the server 102 can comprise a controller that provides a hardware interface for one or more components in the I/O system. For example, the server 102 can have an audio controller that communicates with I/O devices that handle audio data or a camera controller that specifically communicates with a camera. The server 102 is generally located in a physical room with the I/O system to help achieve real-time response.

In some embodiments, the I/O system can comprise any number of input devices, output devices, or media switches. An input device typically includes a sensor to receive data, such as a keyboard to receive tactile signals, a camera to receive visual signals, or a microphone to receive auditory signals. Generally, there can be a sensor to capture or measure any physical attribute of any portion of the physical room. Additional examples of a physical attribute include smell, temperature, or pressure. There can also be sensors to receive external signals, such as a navigation device to receive satellite Global Positioning System (GPS) signals, a radio antenna to receive radio signals, or a set-top box to receive television signals. These sensors do not normally receive signals generated by a user but may still serve as media sources. An output device is used to produce data, such as a speaker to produce auditory signals, a monitor to produce visual signals, or a heater to produce heat. An integrated device integrates input features and output features and typically includes a camera, a microphone, a screen, and a speaker. Examples of an integrated device include a desktop computer, laptop computer, tablet computer, smartphone, or wearable device. A media switch typically comprises a plurality of ports into which media devices can be plugged. The media switch is configured to then re-direct data communicated by media sources to output channels, thus "turning on" or "activating" connections with specific output devices in accordance with instructions from the server 102. In general, one or more of the input devices can be selected to capture participant actions in addition to or instead of other activities in the physical room. The selected input devices can be dedicated to such use or can concurrently capture other activities in the physical room. For example, the microphone capturing spoken words from a participant can be connected to a speaker to broadcast the spoken words, and the microphone can also capture other sounds made in the physical room.

In this example, the media switch 124 can comprise many ports for connecting multiple media and I/O devices. The media switch 124 can support a standard interface for media transmission. The media devices 122 and 126 communicating with the media switch 124 can be video sources. The server 102 can serve as an intermediary media source to the media switch 124 by converting data received from certain input devices to a format compatible with the communication interface supported by the media switch 124. The media devices 128 and 130 communicating with the media switch 124 can include a digital audio device or a video projector, which may be similar to other output devices but being specifically compatible with the communication interface supported by the media switch 124. The additional input devices 114 and 116 can be a microphone and a camera. The integrated devices 132 and 120 can be a laptop computer and a mobile phone. The server 102 and the components of the I/O system can be specifically arranged in the physical room to maximize the communication efficiency and overall performance.

The networks 118 may be implemented by any medium or mechanism that provides for the exchange of data between the various elements of FIG. 1. Examples of networks 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the server 102 is programmed to receive tracked action data associated with one or more users from one or more computer devices, which could include one of the integrated devices 120 or 132. The tracking of actions and generation of tracked action data can involve receiving data regarding what is happening in the physical room by an input device and identifying and interpreting a command issued by a participant in the physical room from the data by a computing device coupled to the input device. The identification and interpretation of a command performed via physical interaction with an input device, such as a keyboard or a touchpad, for example, could be straightforward. The identification and interpretation of a command in general can be performed using existing techniques known to someone skilled in the art, such as the one described in U.S. Pat. No. 10,838,881.

In some embodiments, the server 102 is programmed to process the tracked actions associated with one or more users to identify compound actions that correspond to sequences of actions performed by a user. The server 102 is further programmed to generate instructions which, when executed by a computing device, cause an output device coupled to the computing device to present deep links each representing a compound action and usable by the user to execute the compound action in one step.

In some embodiments, the server 102 is programmed to receive invocation data indicating an invocation of a deep link from an input device or an integrated device. The server is further programmed to cause performance of the corresponding compound action, which corresponds to a sequence of actions. For example, the server 102 can send instructions for performing an action of the sequence of actions to any device required to perform the action. When the sequence of actions can all be performed by the input device or a coupled integrated device or output device, sending any invocation data to the server 102 can be optional.

3. Example Computing Devices

Figure 2:
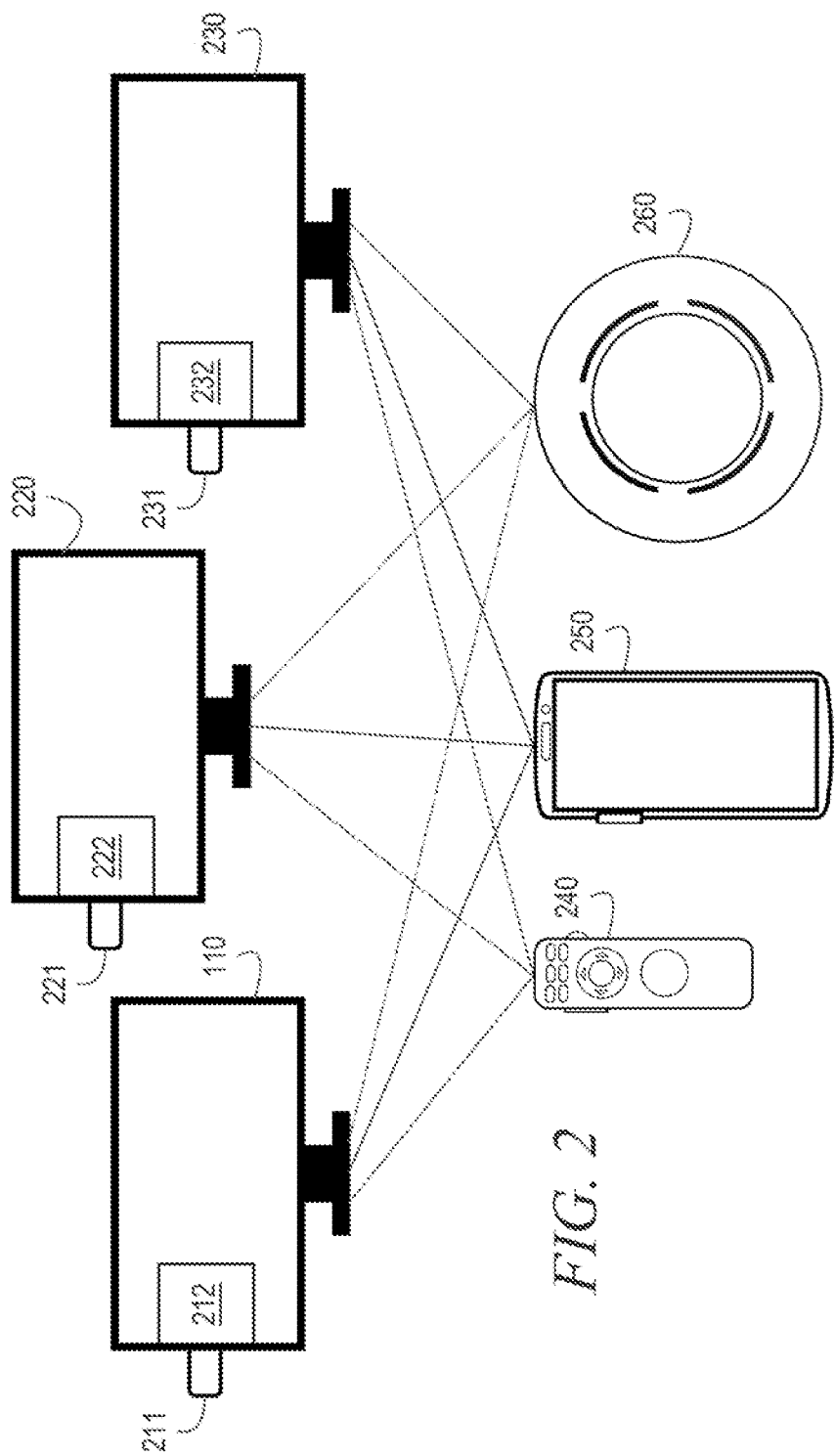
FIG. 2 illustrates an example content presentation environment with integrated output devices paired to remote-control units in which aspects of the illustrative embodiments may be implemented.

FIG. 2 illustrates an example content presentation environment 200 with IODs paired to RCUs in which aspects of the illustrative embodiments may be implemented. FIG. 2 is shown in simplified, schematic format for purposes of illustrating a clear example and other embodiments may include more, fewer, or different elements. In some embodiments, the content presentation environment 200 includes a plurality of IODs 210, 220, 230, each coupled to a respective one of the dongles 211, 221, 231, and a plurality of RCUs 240, 250, 260. The IODs 210, 220, 230 can be examples of media devices 128 and 130 or integrated devices 132 and 120 in FIG. 1, for example. In some embodiments, the RCUs 240, 250, 260 can communicate with the devices 120, 128, 130, 132 in FIG. 1 via the server 102. In other embodiments, the RCUs 240, 250, 260 can communicate directly with devices 120, 128, 130, 132 or via dongles 211, 221, 231, as will be described in further detail below. Each RCU could be considered as an input device, an integrated input device, or an integrated I/O device. In some embodiments, the server 102 can perform some of the workload of RCUs 240, 250, 260 or IODs 210, 220, 230. That is, some functions described below with respect to the RCUs and IODs can be provided as services that are hosted by the server 102. Examples of functions that can be provided as services include user profile management, device profile (e.g., detecting and storing capabilities of IODs) management, hosting data structures of mappings of use modes to actions and mappings of actions to user interactions, etc.

In some embodiments, each of the dongles 211, 221, 231 is coupled to its respective IOD 210, 220, 230 via a physical interface port. In one example embodiment, each of the dongles 211, 221, 231 is coupled to its respective IOD via a Universal Serial Bus (USB) interface port. In another example embodiment, each of the dongles 211, 221, 231 is coupled to its respective IOD via a High-Definition Media Interface (HDMI™) port. HDMI is a trademark of HDMI Licensing Administrator, Inc. in the United States, other countries, or both.

Each of the RCUs 240, 250, 260 has a processor and a memory for storing instructions and data structures. Each RCU is configured to execute the instructions on the processor to perform activities described below with respect to the illustrative embodiments. In an alternative embodiment, each RCU can include special-purpose hardware for performing the activities described with respect to the illustrative embodiments.

Each of the RCUs 240, 250, 260 can be paired to one or more of the IODs 210, 220, 230 via the dongles 211, 221, 231, and vice versa. The dongles 211, 221, 231 have a processor, a memory, and other resources for executing software instructions. In other embodiments, the dongles can include special-purpose hardware for performing some or all of the functions of the dongles.

In some embodiments, the RCUs 240, 250, 260 and the dongles 211, 221, 231 communicate using a radio frequency signal. The RCUs 240, 250, 260 and the dongles 211, 221, 231 are configured to generate and interpret specialized signals for communicating context information and commands. For example, context information can include a hierarchy of embedded objects or an organized set of items, including all applications installed on a given IOD. Thus, the context information can be communicated as a multi-part signal, where the first part based on the length or some other signal attributes would identify the active application, the second part the active object, and so forth. The signal format can become even more complex when there are multiple objects at the same position. Thus, in some embodiments, the RCUs and dongles or IODs communicate with a proprietary, predetermined communication protocol that specifies how context information is to be formatted in the wireless signals.

In an example embodiment, the RCUs 240, 250, 260 pair to the dongles 211, 221, 231 via a wireless network protocol, such as communication protocols used by the Bluetooth® short-range wireless technology standard. BLUETOOTH is a registered trademark of the Bluetooth Special Interest Group (SIG), Inc. in the United States, other countries, or both. The RCUs 240, 250, 260 can be paired to the IODs 210, 220, 230 in a one-to-one, one-to-many, or many-to-many arrangement. For example, RCU 240 can be paired to only IOD 210, to IOD 210 and IOD 220, or to all IODs 210, 220, 230. As another example, IOD 220 can be paired to only one RCU, such as RCU 250, to RCU 240 and RCU 250, or to all RCUs 240, 250, 260.

In an alternative embodiment, one or more of the IODs 210, 220, 230 can include wireless communication interfaces, and the RCUs 240, 250, 260 can communicate directly with the IODs without a dongle. For example, many modern devices can connect to a local area network or the Internet via wireless networking protocols and can pair with devices using the Bluetooth® short-range wireless technology standard.

In one embodiment, each of the IODs 210, 220, 230 is configured with an operating system and an application platform for executing applications for presenting content. For example, IOD 210 can be a smart TV device, also referred to as a connected TV. In some example embodiments, each of the IODs 210, 220, 230 runs an operating system, such as the Android™ platform, the tvOS™ software platform for television, or the Roku® operating system. In some example environments, the application platform can be, for example, the Roku® smart TV application platform, the webOS application platform, the tvOS® software platform for television, or the Google Play™ store. ANDROID and GOOGLE PLAY are trademarks of Google LLC in the United States and other countries. TVOS is a trademark of Apple Inc. in the United States and other countries and regions. ROKU is a trademark of Roku, Inc. in the United States and other countries. In some embodiments, one or more of IODs 210, 220, 230 are capable of communicating directly with RCUs 240, 250, 260 via wireless protocols, such as the Bluetooth® short-range wireless technology standard or the IEEE 802.11 family of standards.

In one example embodiment, each of the IODs 210, 220, 230 is also configured with a companion application 212, 222, 232 for communicating with the dongle to send context information to the RCUs 240, 250, 260 and to receive commands from the RCUs 240, 250, 260. In one embodiment, the companion application 212, 222, 232 is a device driver, which includes software that operates or controls a particular type of device that is attached to the IOD 210, 220, 230 via a USB interface port, for example. In this case, such a particular type of device could be one of the dongles 211, 221, and 231. A device driver provides a software interface to hardware devices, enabling operating systems and other computer programs to access hardware functions without needing to know precise details about the hardware being used. A device driver communicates with the device through the computer bus, such as a USB interface port, to which the hardware connects. When a calling application (e.g., an application being executed to present content, a supplemental companion application that runs in the background, or a part of the operating system) being executed on an IOD invokes a routine in the device driver, the device driver issues commands to the dongle. In response to the dongle sending data back to the device driver, the device driver can invoke routines in the original calling application.

In one embodiment, companion applications 212, 222, 232 can be background applications that stay resident in memory and collect information from the operating system and other applications running on the IODs 210, 220, 230. The background applications can be specifically designed to send information to RCUs 240, 250, 260 and receive commands from RCUs 240, 250, 260 to implement aspects of the illustrative embodiments to be described in the description below. The background applications can use application programing interfaces (APIs) of other applications executing on the IODs 210, 220, 230 to receive data from or send data to the other applications. An application programming interface (API) is a way for two or more computer programs to communicate with each other. It is a type of software interface, offering a service to other pieces of software. An API specification defines these calls, meaning that it explains how to use or implement them. In other words, the API specification defines a set of actions that can be performed by the application. Thus, the API of an application executing on an IOD can have methods or subroutines for extracting context information, such as the name of the application, the filename of a file being operated on by the application, and a position in the file that is being presented by the application. The API of an application can also have methods or subroutines for performing a set of actions. For example, the API of a presentation program can have methods or subroutines for requesting the name of the application, the name of the file being operated on by the application, and a current slide being presented. The API of an audio player application can have methods or subroutines for pausing, playing, skipping back, skipping forward, playing the next file in a playlist, etc. Background applications can make calls to implement the API of an application to request the context information or to send commands to control content presentation. In one embodiment, companion applications 212, 222, 232 can be implemented as plugins or extensions of applications executing on the IODs 210, 220, 230. For example, the companion applications 212, 222, 232 can be web browser extensions or plugins that are specific to a particular suite of office applications.

In some embodiments, one or more of the IODs 210, 220, 230 are configured with a platform for executing applications, such as a suite of office applications. In one embodiment, a web browser is installed on an IOD, and the applications are executed as services hosted by a web server. For instance, the applications can be office applications that are part of a web-based suite of office tools. Thus, the web browser is an application installed on an IOD, which can be executed to provide a platform for running and executing one or more web-based applications.

In some embodiments, dongles 211, 221, 231 are configured to install one or more applications on their respective IODs. In one embodiment, each of the dongles 211, 221, 231, upon insertion into an interface port of the IOD 210, 220, 230, installs or prompts a user to install a respective companion application on the IOD 210, 220, 230. In another embodiment, each of the dongles 211, 221, 231 can install other applications for presenting content, such as presentation software, a web browser, a video or audio program, etc. In an example embodiment, applications installed by a dongle 211, 221, 231 are instrumented with logic for collecting and reporting context information to the dongle 211, 221, 231.

IODs 210, 220, 230 can include other examples of integrated output devices that integrate a processor and memory with an output mechanism. For instance, IODs 210, 220, 230 can include a smart speaker that is capable of being controlled by an RCU 240, 250, 260. A smart speaker is a type of loudspeaker and voice command device with an integrated virtual assistant that offers interactive actions. In this example embodiment, companion applications 212, 222, 232 can be implemented as "skills" or "actions" through a virtual assistant, which provides services that provide information (e.g., weather, movie database information, medical information, etc.) or plays sound files (e.g., music, podcasts, etc.), for example. Other output mechanisms, such as overhead projectors or the like, can be integrated into IODs 210, 220, 230.

In an example embodiment, dongle 211, for example, is a digital media player device, also referred to as a streaming device or streaming box, connected to an HDMI port of the IOD 210. A digital media player device is a type of microconsole device that is typically powered by low-cost computing hardware including a processor and memory for executing applications that present media content on an output device, typically a television. In this example, the dongle 211 can run an operating system, such as the Android™ platform, the tvOS™ software platform for television, or the Roku® operating system. In some example environments, the application platform can be, for example, the Roku® smart TV application platform, the webOS application platform, the tvOS® software platform for television, or the Google Play™ store. In one example, the dongle 211 can also run the companion application 212 such that the output mechanism of the IOD 210 and the dongle 211 combine to provide appropriate services that facilitate activities in the physical room. The RCUs 240, 250, 260 can pair to the dongle 211 and control presentation of content on the output mechanism of the IOD 210 through the dongle 211.

In another example embodiment, dongle 211, for example, is a specialized computing device connected to an HDMI port of the IOD 210. For instance, dongle 211 can be implemented using a single-board computer (SBC) configured with a light-weight operating system and specialized software for implementing applications for presenting content and communicating with RCUs 240, 250, 260. A single-board computer is a complete computer built on a single circuit board, with one or more microprocessors, a memory, input/output (I/O) devices, and other features typical of a functional computer, such as wireless communication technologies. Single-board computers are commonly made as demonstration or development systems, for educational systems, or for use as embedded computer controllers. As a specific example, dongle 211 can be implemented using the Raspberry Pi™ single-board computer running the Linux™ operating system. RASPBERRYPI is a trademark of the Raspberry Pi Foundation in the United States, other countries, or both. LINUX is a trademark of the Linux foundation in the United States and other countries.

In some embodiments, RCUs 240, 250, 260 are configured to communicate directly with each other. For example, an RCU can be paired to other RCUs in the physical room or can communicate directly or through a wireless router via wireless communication. Alternatively, an RCU can communicate information to IODs 210, 220, 230, which can in turn forward the information to other RCUs in the physical room. For example, if a first RCU has control of an application running on an IOD, the IOD can inform a second RCU that the first RCU has control, and in response to the first RCU relinquishing control, the IOD can inform that second RCU that it now has control over the application.

In one embodiment, RCU 240 is an electronic device used to operate another device using physical control elements via wireless communication. In an example embodiment, the RCU 240 communicates with one or more of dongles 211, 221, 231 via radio frequency signals, the Bluetooth® short-range wireless technology, or other communication protocols or standards. In this example, the RCU 240 pairs to one or more of the IODs 210, 220, 230 via their respective dongles. The physical control elements can include buttons, scroll wheels, dials, rocker switches, etc.

Figure 3:
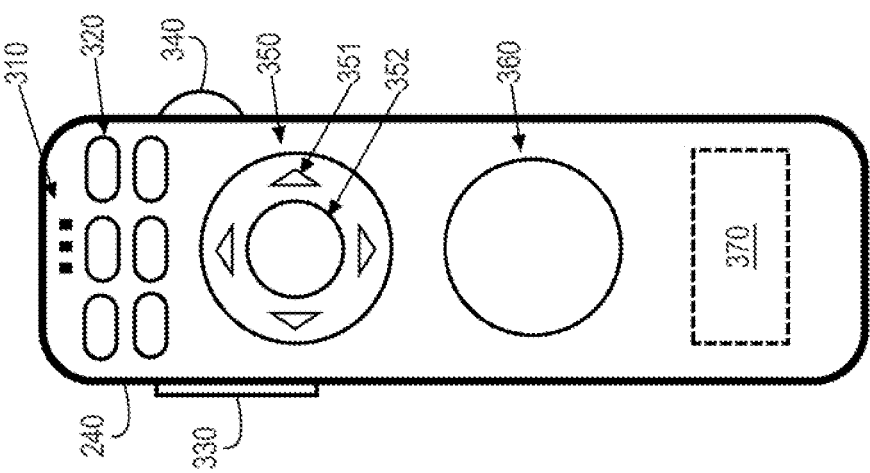
FIG. 3 is a diagram illustrating components of a remote-control unit with physical control elements in accordance with an illustrative embodiment.

FIG. 3 is a diagram illustrating components of a remote-control unit 240 with physical control elements in accordance with an illustrative embodiment. RCU 240 includes microphone 310, physical buttons 320, rocker switch 330, scroll wheel 340, directional buttons 350, dial 360, and motion sensors 370. Physical buttons 320 can be mapped to different actions, such as executing particular applications, opening particular objects or files, activating sensors (e.g., a microphone), etc. In some embodiments, the physical buttons 320 are labeled with certain default actions, such as a microphone graphic for speech input, predetermined applications, etc.

Rocker switch 330 is configured to rock up or down on the side of RCU 240. Scroll wheel 340 is configured to rotate such that a user's thumb or finger moves in an up and down motion. Rocker switch 330 and scroll wheel 340 can be mapped to operations that logically have an up or down action, such as volume up, volume down, scroll up, scroll down, etc. In some embodiments, the rocker switch 330 and scroll wheel 340 are generally associated with up and down actions.

Directional buttons 350, sometimes referred to as a directional bad or D-pad, includes left, right, up, and down buttons 351 and a selection button 352. In some implementations directional buttons 350 can be configured to accept diagonal direction inputs as well, such as upward-left or downward-right. In some example embodiments, a user can use the directional buttons 351 to move between objects on a screen of the IOD and use the selection button 352 to select an object. In other embodiments, the directional buttons 351 can be mapped to particular actions, such as scrolling up, down, left, or right, increasing or decreasing the volume, skipping forward or back in audio or video content, next slide or previous slide, zoom in or out, moving an object on the screen, etc. In some embodiments, the directional buttons 351 are associated with directional actions, and in particular the selection button 352 is associated with a selection action.

The dial 360 can be mapped to operations that indicate rotating actions or left/right actions, such as rotating an object on the display screen of an IOD, scrolling left and right, increasing or decreasing the volume, zooming in or out, etc. In some embodiments, the dial 360 is associated with rotating actions or left and right actions.

The microphone 310 is configured to be activated for sound input or deactivated. In some embodiments, a button, such as one of physical buttons 320, can be selected to activate or deactivate the microphone 310. For example, a user can activate the microphone 310 to enter speech commands. In some embodiments, the microphone 310 is associated with actions for which there are predetermined speech commands. In another embodiment, the microphone 310 can continuously listen to monitor for a waking command to transition from a monitoring mode to a speech input mode.

The motion sensors 370 include sensors that detect movement of the RCU 240. In one example embodiment, the motion sensors 370 include accelerometers that detect movement in lateral, longitudinal, vertical, or other directions and gyroscope devices that detect rotation about lateral, longitudinal, vertical, or other axes. Thus, in this example, the motion sensors 370 include three accelerometers and three gyroscope devices to detect movement and rotation in three dimensions. In some embodiments, the RCU 240 can be calibrated with respect to a reference location such that the motion sensors 370 can track a location of the RCU 240 within a predetermined space, such as a classroom for example. In other embodiments, the motion sensors 370 can be used to detect motion gestures, such as flick right/left/up/down, wave, circle, checkmark, etc. In some embodiments, the motion sensors 370 are associated with actions for which there are predetermined motion gestures.

In some embodiments, the RCU 240 has additional built-in sensors, such as one or more cameras. For example, the RCU 240 can have a front camera in a vertical configuration for authenticating a teacher user or another user, a back camera in a vertical configuration for taking images of a student's work, or a forward camera in a horizontal configuration for identifying source and target IODs. The RCU 240 can be configured to automatically select a camera depending on the current camera configuration, user command, or other factors. For example, in a horizontal configuration, the data from the forward camera can be processed first, while given a user command for authentication, the data from the front camera can be processed first.

In one embodiment, RCU 250 is a touchscreen device, such as a smartphone device or tablet computer, for example, configured with an application for implementing functionality for controlling one or more of IODs 210, 220, 230. In one embodiment, the RCU 250 communicates with one or more of dongles 211, 221, 231 using wireless communication protocols used by the Bluetooth® short-range wireless technology standard or wireless network protocols based on the IEEE 802.11 family of standards, for example. In this example, RCU 250 pairs to one or more of IODs 210, 220, 230 via their respective dongles. In an embodiment, RCU 250 includes software user interface elements, such as touchscreen controls, voice commands, movement gestures (e.g., shaking, pointing, etc.), touchscreen gestures or other input captured by a camera, etc.

Figure 4:
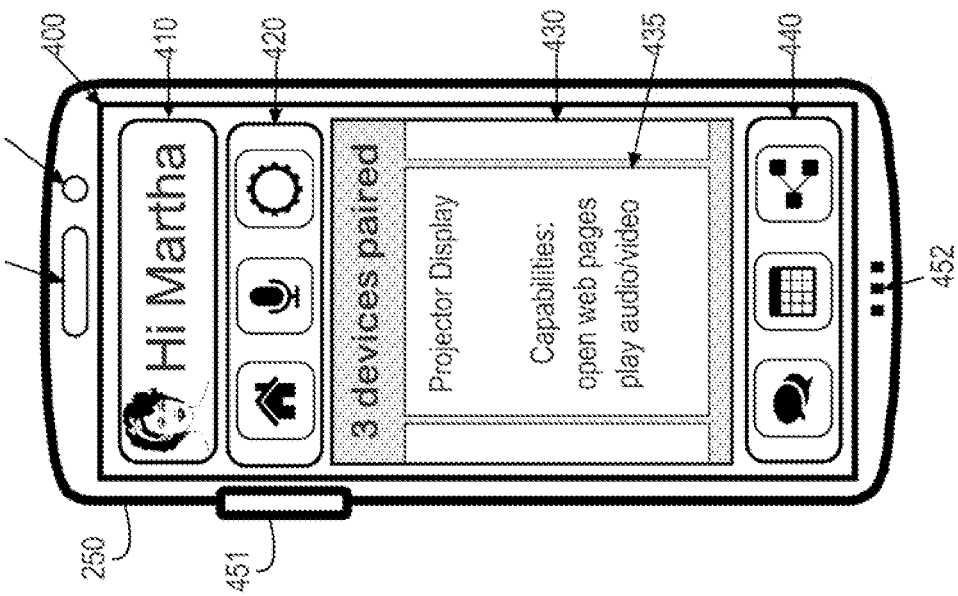
FIG. 4 is a diagram illustrating components of a remote-control unit with touchscreen control elements in accordance with an illustrative embodiment.

FIG. 4 is a diagram illustrating components of a remote-control unit with touchscreen user interface elements in accordance with an illustrative embodiment. In the depicted example, RCU 250 is a touchscreen device having a touchscreen interface 400, rocker switch 451, microphone 452, camera device 453, and speaker 454. Information can be presented to the user via the screen of the touchscreen interface 400 and the speaker 454. In some embodiments, the touchscreen interface 400 is used to present software controls that are configured for operation of the RCU 250. Software controls can mimic physical controls, such as buttons, dials, switches, etc. For example, software controls can include buttons, radio buttons, drop-down boxes, sliders, etc. Furthermore, the touchscreen interface 400 can also receive touchscreen gestures, such as swipe left, swipe right, swipe up, swipe down, pinch-to-zoom, two-finger rotate, etc.

Rocker switch 451 is configured to rock up or down on the side of RCU 250. Rocker switch 451 can be mapped to operations that logically have an up or down action, such as volume up, volume down, scroll up, scroll down, etc. In some embodiments, the rocker switch 451 is generally associated with up and down actions. The microphone 452 is configured to be activated for sound input or deactivated. In some embodiments, a button, such as a software button, can be selected to activate or deactivate the microphone 452. For example, a user can activate the microphone 452 to enter speech commands. In some embodiments, the microphone 452 is associated with actions for which there are predetermined speech commands.

The camera 453 is configured to receive video input. In one embodiment, the camera 453 is used to receive video of the user's face for facial recognition, lip reading, etc. In another example embodiment, the camera 453 can be used to recognize movement of the RCU 250. For example, one or more machine learning models can be trained to recognize different motion gestures, such as flick left, flick right, wave, etc.

In an embodiment, RCU 260 is a device having a specialized form factor for interaction in a particular environment. FIG. 5 is a diagram illustrating components of a remote-control unit 260 having a specialized form factor in accordance with an illustrative embodiment. In one example embodiment, RCU 260 has a substantially spherical shape with an interior housing 510, which contains a processor, a memory, communication devices, input sensors, and output devices, and a soft outer material 501, such as a foam material, surrounding the interior housing. In some embodiments, interior housing 510 contains motion sensors 511, wireless transceiver 512, microphone 513, haptic feedback devices 514, camera 515, display 516, and speaker 517. The interior housing 510 can contain more or fewer components depending on the implementation, and some components shown inside the interior housing can be positioned outside the interior housing, and vice versa. In this example, RCU 260 can function as a ball that can be thrown, bounced, rolled, or squeezed. In some example embodiments, RCU 260 is used in a classroom environment such that the RCU 260 can be thrown or rolled from a teacher to a student or between students. The various sensors, such as the motion sensors 511, microphone 513, or camera 515, serve as input devices and collect user input. The user interface elements in this case could correspond to the RCU 260 as a whole or specified portions of the RCU. For example, a user action can be rotating the RCU 260 180 degrees, and another user action can be squeezing the bottom of the RCU 260 with a left hand.

In one embodiment, the components of the RCU 260, particularly the components within the interior housing 510, are welded or otherwise fastened and protected using known techniques to stay intact during motion. In the example of a classroom, it is advantageous to provide an RCU 260 that can withstand exaggerated user interactions, especially in embodiments where the RCU 260 is used to play games involving throwing or bouncing.

The motion sensors 511 include sensors that detect movement of the RCU 260. In one example embodiment, the motion sensors 511 include accelerometers that detect movement in lateral, longitudinal, vertical, or other directions and gyroscope devices that detect rotation about lateral, longitudinal, vertical, or other axes. Thus, in an example, the motion sensors 511 include three accelerometers and three gyroscope devices to detect movement and rotation in three orthogonal dimensions. In some embodiments, the RCU 260 can be calibrated with respect to a reference location such that the motion sensors 511 can track a location of the RCU 260 within the physical room, such as a classroom. In other embodiments, the motion sensors 511 can be used to detect a series of changing positions of the RCU 260 over time, which can be associated with motion gestures. For example, the series of changing positions can include a higher position for two seconds followed by a lower position for three seconds. Examples of motion gestures include flick right/ left/up/down, wave, circle, checkmark, etc. In some embodiments, the motion sensors 511 are associated with actions for which there are predetermined motion gestures. The RCU 260 can also use motion sensors 511 to detect when the RCU 260 is being bounced, thrown, or rolled. In addition, the RCU 260 can use motion sensors 511 to track movement of the RCU 260 and, thus, to detect a location of the RCU 260.

In one embodiment, the RCU 260 includes pressure sensors 505, which detect pressure caused by squeezing or bouncing the RCU 260 in terms of amount, position, direction, duration, or other attributes. For example, a student can squeeze the RCU 260 for two seconds to activate microphone 513 and enable speech input. As another example, the teacher can hold the RCU 260 over the head and squeeze the RCU 260 to mute the volume on IODs 210, 220, 230 via wireless transceiver 512 to get the attention of students. Furthermore, the RCU 260 can use pressure sensors 505 to detect when and how the RCU is bounced, which can be interpreted as a user input element.

In one example embodiment, the RCU 260 has a transparent portion of the surface, which can be substantially flat or curved, such that a user can see the display 516 inside the RCU 260 and such that the camera 515 within the internal housing can capture video input. The RCU 260 can be designed to have a center of gravity that is farther from the flat surface than the center of the volume of the RCU, to help ensure that the curved end is on the bottom for holding while the flat side is on the top for viewing while suffering less friction. In an embodiment, video input received by camera 515 can be used to augment motion sensors 511 for location determination and for motion gesture detection. In addition, the camera 515 can receive video input of a user's face for facial recognition for identifying the user of the device.

The RCU 260 can present information to users via the display 516 or by haptic feedback devices 514. Haptic feedback, sometimes referred to as "force feedback," includes technology that provides feedback to the user by touch. Examples of haptic feedback devices 514 include vibration devices and rumble devices. Audio feedback can also be provided to the user via speaker 517. In one embodiment, the RCU 260 can use speaker 517 to amplify speech input provided to microphone 513.

The RCU 260 uses wireless transceiver 512 to receive information from and to send commands or requests to IODs 210, 220, 230 via their respective dongles. In some embodiments, the RCU 260 uses wireless transceiver 512 for detecting a location of the RCU 260 by triangulating signals received from multiple devices in the environment. For example, the RCU 260 can measure the strength of signals received from dongles 211, 221, 231 and/or from other devices that transmit wireless signals.

In other embodiments, the specialized form factor of an RCU can take different shapes or compositions. For example, an RCU can take the form of a cube, pyramid, rod, etc. As another example, an RCU can take the form of a toy, such as a stuffed bear, action figure, scale model car or airplane, etc. Other form factors will become apparent in different implementations and different environments. For instance, in a teaching environment in which life-saving techniques are being taught, an RCU can take a humanoid form.

The RCUs 240, 250, 260 are configured or programmed to send commands to the IODs 210, 220, 230 in response to user interaction with user interface elements of the RCUs 240, 250, 260. In one embodiment, the commands are encoded as standard keyboard scan codes, such as character codes, number codes, cursor movement codes, space and enter codes, etc. Alternatively, the RCUs 240, 250, 260 are configured or programmed to send more complex commands, such as coordinates on a touchscreen input area, custom requests or commands, for example.

4. Example Computing Components

Figure 6:
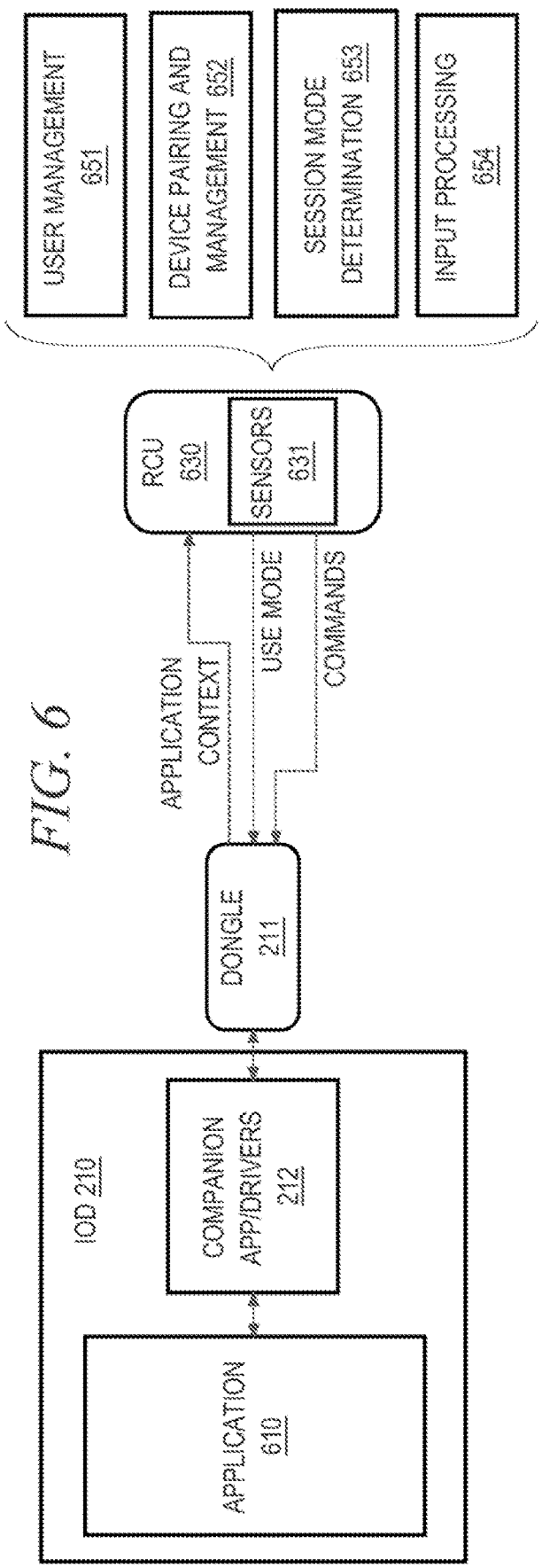
FIG. 6 is a diagram illustrating example functional components of a system for a smart remote-control unit that adapts to a physical environment in accordance based on attributes of the smart remote-control unit with an illustrative embodiment.

FIG. 6 is a diagram illustrating example functional components of a system for a smart remote-control unit that adapts to a physical environment based on attributes of the RCU in accordance with an illustrative embodiment. FIG. 6 is an expanded diagram of components within content presentation environment 200 shown in FIG. 2. In an embodiment, application 610 and companion application 212 execute on IOD 210. The IOD 210 is coupled to dongle 211 as described above. The dongle 211 is paired with one or more RCUs, such as RCU 630, which can be any one of RCUs 240, 250, 260 in FIG. 2, for example.

In some embodiments, the RCU 630 includes user management service 651, device pairing and management service 652, session mode determination service 653, and input processing service 654. One or more processors of the RCU 630 together with one or more memories of the RCU 630 cooperate to offer these services. For example, these services can correspond to sets of computer-executable instructions stored in one of those memories which when executed by one of those processors perform the services.

In some embodiments, the application 610 is one of a plurality of applications installed on the IOD 210 to present content and perform other tasks in the physical space. In one example embodiment, the application 610 executes within a platform, such as a web-based suite of office tools. Thus, the application 610 can be an application that is installed directly on the IOD 210, an application that executes within an application platform, or an application that executes as a service that is hosted by a server.

The user management service 651 enables a user to log in using a user profile and customizes the user interface elements of the RCU 630 according to the user profile. In some embodiments, the user management service 651 authenticates the user by prompting the user to enter a password or personal identification number (PIN). In other embodiments, the user management service 651 can authenticate the user by performing facial recognition or voice recognition or by using biometric sensors, such as a fingerprint sensor, for example. User profiles can be associated with certain authorized actions. For example, a teacher or administrator can perform actions that students are not authorized to perform.

Device pairing and management service 652 provides functions that allow the user to pair the RCU 630 to different IODs, to unpair the RCU 630 from IODs, and to switch control between the IODs that are paired to RCU 630. Pairing the RCU 630 to an IOD 210 establishes a connection between the RCU 630 and the IOD 210 such that information is passed for customizing the RCU 630 and for controlling the IOD. For example, the IOD 210 can send context information to the RCU 630 that specifies the applications installed on the IOD 210 and capabilities of the applications. The user can then select which IOD to control based on these capabilities.

In some embodiments, the device pairing and management service 652 provides further functions that allow the RCU 630 to communicate with the IODs for content transfer purposes. The communication includes receiving source data from a source device of a content transfer, which can include application context, or device data regarding capabilities or operating state of an IOD. The communication can also include transmitting updated source data to a target device of a content transfer, which can include one or more commands, such as incorporating or supplementing a computer object.

In some embodiments, the session mode service 653 provides functions that allow the RCU 630 to determine the session mode, which indicates the type of activity being performed in the physical room. For instance, the session mode can be Q&A, collaboration, clarification, game, or presentation for a classroom. The determination can be based on the current time, the current location of a user of the RCU 630, the current sound level of the physical room, or other real-time attributes of the physical room with respect to a predetermined plan of how the real-time attributes are mapped to the different session modes. The determination could further be based on predetermine priorities of these real-time attributes or an order of these real-time learned over time using regression or other machine learning techniques.

The input processing service 654 receives sensor data and determines particular user interactions with the RCU 630. The input processing service 654 interprets the sensor data and user interactions and sends RCU commands or requests to dongle 211. In one embodiment, the commands are encoded as standard keyboard scan codes, such as character codes, number codes, cursor movement codes, space and enter codes, etc. In another embodiment, the commands are conventional remote codes for controlling media devices, such as cable boxes, digital video disk (DVD) players, etc. Alternatively, the input processing service 654 generates more complex commands, such as custom requests or commands. For example, complex commands can be any commands that can be received and understood by the dongle and applications running on the IOD. For instance, there may be commands that are derived from the application's API specification.

In some embodiments, the input processing service 654 provides functions that allow the RCU 630 to manage user interactions for content transfer purposes. The management includes receiving, from a user, an identifier of an IOD, such as the source IOD of a content transfer, an instruction for performing an activity, such as modifying a computer object handled by a computer application running on an IOD. The management includes identifying the source device and the target device of a content transfer automatically or based on input data from a user. Furthermore, the management includes processing the source data from the source device and generating appropriate commands for further updating the computer object in the source data based on the session mode or other factors. In addition, the management can include handling content transfer errors, including selecting a new target device or using backup source data.

In an embodiment, an RCU can be configured to send a command, automatically or in response to a user input, to start an application or switch to an application that is appropriate to perform a given action. For example, if an action involves playing a sound file, then the RCU can be configured to send a command to an IOD to execute an audio player application or switch to an audio player application that is running in the background. In another embodiment, the RCU can be configured to switch to another paired IOD. Thus, in the example of an action that involves playing a sound file, the RCU can be configured to switch to an IOD with audio only capabilities.

5. Functional Descriptions

5.1. User Management

Returning to FIG. 4, an example user interface of remote-control unit 250 for managing multiple device pairings is shown. In the depicted example, RCU is a touchscreen device, such as RCU 250 in FIG. 2. The user interface of RCU 250 includes a user profile portion 410, a fixed interface portion 420, a paired device management portion 430, and a user favorites portion 440. The user profile portion 410 presents user interface elements that allow a user to log into a user account. In some embodiments, other user interface portions can be customized based on which functions or operations are authorized for different users. For example, a teacher can be authorized to perform different functions than a student. In the example shown in FIG. 4, a user "Martha" is logged in. A user customization engine customizes the user interface panels of the RCU based on the user profile such that the user interface presents user interface elements for functions that are authorized for the user.

The fixed interface portion 420 includes fixed user interface elements for functions that are consistent throughout operation within the content presentation environment 200. In the example depicted in FIG. 4, the fixed interface portion 420 includes a home button, a speech input button, and a configuration options button. As described above, user interface elements included in fixed interface portion can be selected based on the user that logged in via user profile portion 410. In one embodiment, RCU 250 is assigned a role based on the user that is logged into the RCU 250. Thus, different RCUs can be assigned different roles for an IOD based on the users logged into the RCUs. For example, an IOD can be paired with multiple RCUs including a teacher RCU and one or more student RCUs. The user interface elements presented in the user interface portions 420, 430, 440 can be customized based on the role of the RCU 250.

The user favorite interface portion 440 includes user interface elements selected by a user. In one embodiment, user favorite interface portion 440 allows the user to select favorite user interface elements, such as a chat application icon, a calendar application icon, and a share icon. The RCU 250 can be programmed to allow the user to specify which user interface elements are presented in user favorite interface portion 440. In another embodiment, the RCU 250 is programmed to identify which user interface elements are selected most recently, most often, or more frequently by the user. The RCU 250 can then present the identified user interface elements in the user favorite interface portion 440.

5.2. Device Pairing

Returning to FIG. 2, the RCUs 240, 250, 260 can be paired to the IODs 210, 220, 230 in a one-to-one, one-to-many, or many-to-many arrangement. For example, RCU 240 can be paired to only IOD 210, to IOD 210 and IOD 220, or to all IODs 210, 220, 230. As another example, IOD 220 can be paired to only one RCU, such as RCU 250, to RCU 240 and RCU 250, or to all RCUs 240, 250, 260. Thus, in FIG. 6, RCU 630 can be paired with other dongles in addition to dongle 211.

In one embodiment, fixed interface portion 420 includes user interface elements for selecting which user interface portion is displayed in portion 430. Thus, in the depicted example, the fixed interface portion 420 can include a "paired device management" icon. For example, a "paired device management" icon can be presented in place of the speech input icon. In response to the user selecting the "paired device management" icon, paired device management interface portion 430 is displayed. In response to the user selecting the "paired device management" icon, the "paired device management" icon can be replaced with the speech input icon, for example.

The device pairing service 652 presents an IOD user interface card 435 for each IOD paired to the RCU 250 in the paired device management interface portion 430. Each IOD user interface card presents an identifier of a respective IOD and a list of capabilities of the IOD. The user can switch the IOD being controlled by the RCU 250 by switching between the IOD user interface cards 435. In one example embodiment, the user can switch between the IOD user interface cards by swiping left and right. In an alternative embodiment, the IOD user interface cards 435 can be presented vertically, and the user can swipe up and down. Other techniques for switching between IOD user interface cards 435 can be used in other embodiments.

In one embodiment, the device pairing service 652 allows the user to rearrange IOD user interface cards 435 in device management interface portion 430 so that the IOD user interface cards 435 are physically congruent with the IODs. That is, a user can rearrange the IOD user interface cards 435 such that a IOD user interface card on the left corresponds to an IOD on the left side of the content presentation environment, an IOD user interface card in the center corresponds to an IOD in the center of the content presentation environment, and an IOD user interface card on the right corresponds to an IOD on the right side of the content presentation environment. In one embodiment, the user can enter a rearrangement mode by long-pressing within the device management interface portion 430.

In some embodiments, the device pairing service 652 determines actions to assign to user interface elements based on capabilities of the selected IOD card 435. For example, the selected IOD card 435 can indicate that the IOD has the capability of opening web pages. In one embodiment, the user interface assigns actions of running a web browser application and opening a web page associated with a chat service to a particular user interface element. In response to the user selecting a particular user interface element, the RCU 250 is configured to send the action to the dongle 211.

5.3. Content Transfer Setup

Figure 7:
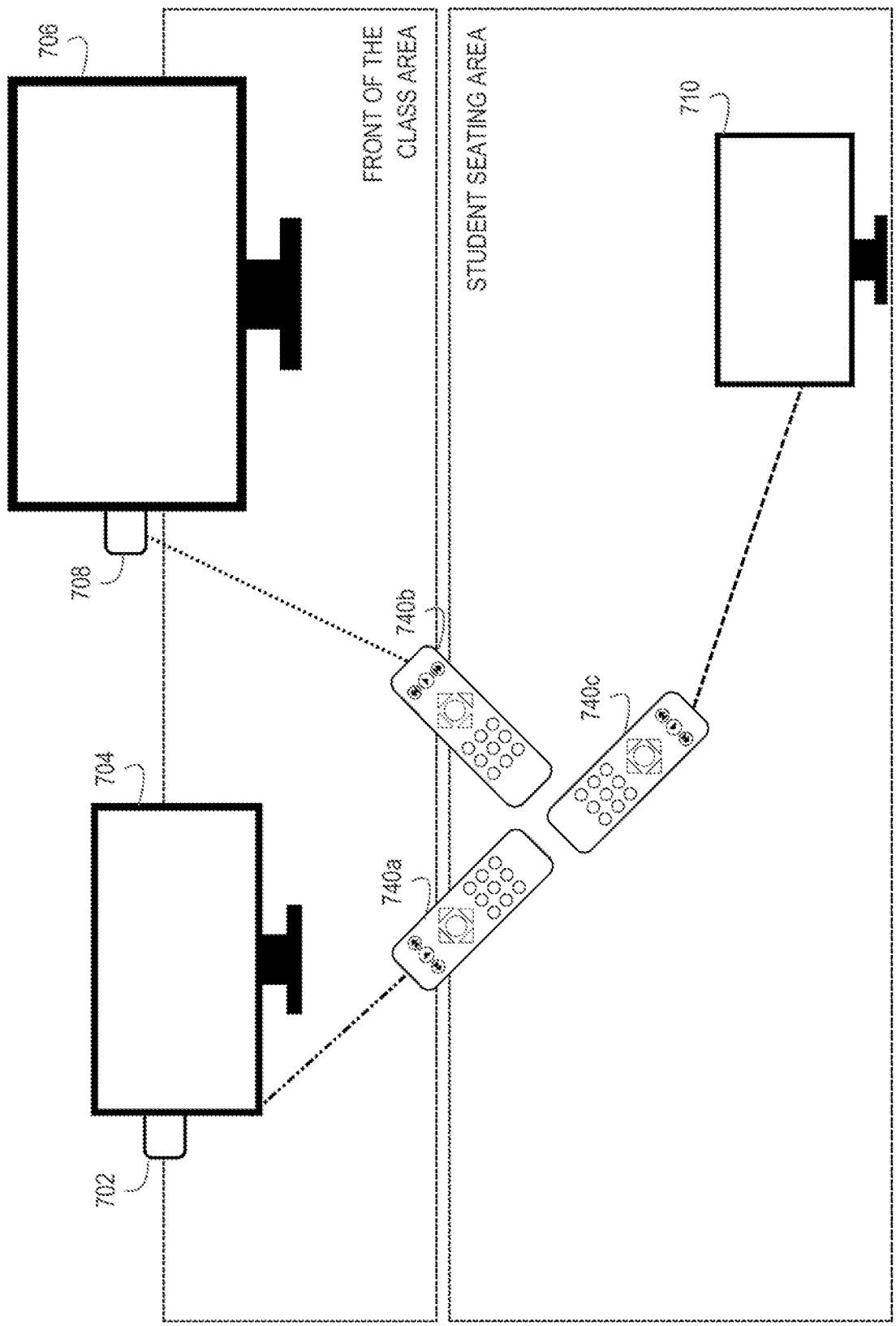
FIG. 7 illustrates an example content transfer set up with integrated output devices and remote-control units in different configurations within a physical room.

FIG. 7 illustrates an example content transfer set up with integrated output devices and remote-control units in different configurations within a physical room. Various IODs paired with an RCU can be located in a physical room, such as a classroom, including a primary IOD 706 coupled with a dongle 708 and a secondary IOD 704 coupled with a dongle 702 located in the front of the physical room. Various individuals, such as a teacher and multiple students, can also be located in the physical room. A student could be working with a personal computing device not paired with the RCU, such as a laptop 710. The RCU can be held by the teacher in various configurations, such as 704a pointing towards the secondary IOD 704, 740b pointing towards the primary IOD 706, or 740c pointing towards the laptop 710. As the RCU changes configurations, a source device and a target device can be identified, and a content transfer from the source device to the target device can be performed.

In some embodiments, an RCU is programmed to receive instructions related to a content transfer from a source device to a target device. The "content" discussed so far generally refers to the digital data being processed and presented to a user by an IOD. The content to be transferred can also refer to digital data being processed and presented to a user by the RCU. The RCU is programmed to retrieve source data from a source device, which includes a representation of the content to be transferred, process the source data to generate updated source data, and transmit the updated source data to a target device to effect the content transfer. The RCU may have one or more user interface elements that can be used to issue instructions related to content transfer. For example, a first "copy" button can be used to initiate a content transfer, and a second "paste" button can be used to conclude a content transfer. The engaging and releasing of a single button can be used to respectively initiate and conclude a content transfer. The sliding of a switch between two positions could be used to respectively initiate and conclude a content transfer. In addition, issuing two speech commands to a microphone could be used to respectively initiate and conclude a content transfer.

In some embodiments, the content transfer involves multiple source devices or multiple target devices. In general, multiple source devices provide contents to be combined, and multiple target devices receive identical contents. The same or additional user interface elements of the RCU can be used to indicate a multi-source or multi-target content transfer. For example, the "copy" button could be pressed multiple times or held for an extended period time while the RCU moves before the "paste" button is pressed to indicate a multi-source content transfer. Similarly, the "paste" button could be pressed multiple times or held for an extended period time while the RCU moves after the "copy" button is pressed to indicate a multi-target transfer.

In some embodiments, the source device is an IOD or the RCU itself. An IOD is assumed to be already paired or registered with the RCU. Upon receiving an instruction to initiate a content transfer, such as the pressing of a "copy" button, the RCU can be programmed to interpret further user input during a following brief period of time (e.g., no more than a second) and identify the source device. For example, the user input may be pointing the RCU towards an IOD, which can be interpreted by processing the recorded image or a location of what is facing the RCU periodically or when the RCU is ultimately stationary, or the user may be speaking the name of an IOD into the RCU, which can be interpreted by processing the recorded speech. The identification of the source device can include going down an ordered list of candidates until the source device is found. For example, the ordered list may indicate, from the top down, the IOD named by a user, the closest IOD in the direct line of sight, the closest IOD within a five-foot radius, the IOD favored by the user, and a default IOD. Such a list may not have a default, and the RCU can be regarded as the source device when an IOD cannot be identified from the list. Alternatively, the instruction to initiate a content transfer could directly specify the RCU as the source device. For example, the "copy" button could be pressed twice in quick succession to indicate that the RCU would be the source device.

In some embodiments, the content to be transferred corresponds to a point in time or an associated brief period of time. An IOD can have an active computer application that is interacting with a user and an active computer object being operated on by the active application. For example, the active computer application can be a word processing tool, and the active computer object could be a document being edited. When the source device is an IOD, the source data includes a copy of the active computer object corresponding to a particular point in time. In this case, the computer object is considered as a "specific" computer object and may have a hierarchical structure specific to the computer application. For example, a document may have a paragraph, which may have a word, and the document processing tool may offer an API for accessing the hierarchical structure. The source data can also include a captured copy of the output of the IOD corresponding to that point in time, such as a capture of what is displayed on a screen, a capture of what is played by a speaker, or a combination thereof. In this case, the captured copy is to be treated as a "generic" computer object and handled by a tool for processing an image, an audio file, or a video, regardless of the original computer application. Such a tool is considered as a default computer application as it is used to handle a computer object regardless of an active computer application and is typically executed on an IOD and the RCU. Upon identifying an IOD as the source device, the RCU can be programmed to send a request to that IOD or a dongle coupled to that IOD for the content to be transferred.

In some embodiments, in response to the request, the IOD (or the associated dongle) is programmed to transmit source data related to the active computer application and the active computer object to the RCU. As discussed above, the IOD can be programmed to keep track of the active computer application and the active computer object using exiting approaches. For example, an operating system may have an API that allows the determination of which window and thus which computer application currently has the focus, and a computer application may have an API that allows the determination of which computer object currently has the focus. The IOD thus can be programmed to make calls to the appropriate APIs. Therefore, the source data to be transmitted to the RCU can include a copy of the active computer object corresponding to a particular point in time. The source data can also include metadata of the active object, such as an identifier of the active computer application or certain attributes of the active object. For example, when the active computer object is a document, the metadata can identify a word processing tool and a path within a hierarchical structure of the document that was last accessed or had the focus, some of which information can be saved as part of the document. The IOD can also be programmed to additionally provide a captured copy of its output, such as a screen capture, an audio hijack, or a combination of both, as backup source data, as further discussed below.

In some embodiments, when the source device is the RCU, the RCU is programmed to generate the source data corresponding to a particular point in time. Upon identifying the RCU as the source device, the RCU can be programmed to interpret further user input during a following period of time and determine how to generate the source data. For example, when the user input is a speech command captured by a microphone or a hand drawing captured by a touch screen, the RCU can be programmed to treat the captured data as the source data. In the absence of any user input, the RCU can be programmed to take a photo, record a sound, or record a brief video from its current location and treat the photo, sound, or video as the source data. The RCU can also be programmed to generate backup source data from a source device when it is facing the source device, thus acting as a backup source device. The RC can then be programmed to process the backup source data when the source data from the source device cannot be successfully processed or transmitted by the RCU or successfully received or processed by a target device.

In some embodiments, the target device is an IOD different from the source device. Upon receiving an instruction to conclude a content transfer, such as the pressing of a "paste" button, the RCU can be programmed to identify a target device, similar to identifying a source device, as discussed above. When a target device cannot be found from going down an ordered list of candidates, the RCU can be programmed to consider the device data of an IOD or the content to be transferred. As discussed above, the RCU can be programmed to receive static data of an IOD, such as capabilities of the output mechanism or the processor when the IOD is initially paired with the RCU. The RCU can be programmed to further receive dynamic data of an IOD according to a schedule, such as a list of computer applications that are installed or running or information regarding the data that is being outputted. As further discussed below, the RCU can be programmed to analyze the source data to determine the content to be transferred, especially when the source data does not already include a specific computer object or the metadata thereof. The RCU can be programmed to then select an IOD that can handle the content to be transferred as a target device.

5.4. Source Data Processing

In some embodiments, the RCU is programmed to process the source data received from a source device to generate updated source data. When the source device is an IOD, the RCU is programmed to transmit the source data to a target device without any processing, or extract the metadata from the source data and determine whether and how the target device can handle the content to be transferred. For example, when the metadata identifies a first word processing tool as the active computer application and a document as the active computer object, the RCU can be configured to determine whether a copy of the active computer application or any substitute computer application is installed or running on the target device. In the absence of an appropriate computer application installed or running on the target device, the RCU can be configured to generate a command to install or run a specific computer application and include the command in the updated source data, automatically select another IOD to be a target device, or request user attention or input.

In some embodiments, the RCU is programmed to determine a session mode, which can help further determine how to process the source data and generate appropriate commands for the target device, as further discussed below. For a classroom environment, the session mode can be collaboration, clarification, or Q&A, for example. The session mode can be determined from the current time, a user's current position, a user's direct input, or other factors. For example, the current time may indicate that it is a mathematics class according to a class schedule, and the user's current position may indicate that it is Q&A time according to a classroom map. Specifically, the classroom map can map the front and center of the classroom to Q&A, where the teacher is answering specific questions from students, the front and side of the classroom to collaboration, where the teacher is waiting for students working in groups, and the rest of the classroom to clarification, where the teacher is walking past students and putting a student's work up for further discussion.

In some embodiments, when the source data includes a generic computer object, the RCU is programmed to analyze the source data to identify potential computer objects, using existing image, text, or speech processing techniques. In a classroom environment, the source data can represent an activity of a student, such as what was on the screen of a tablet (that is not a paired IOD) or on a piece of paper in front of a student in the classroom. The RCU can be configured to identify from the source data an item of a specific list of items as potential computer objects, where each item is associated with one or more computer applications. For example, this list of items can include a formula, a graph, a paragraph of text, a flowchart, or a map. For a formula, a computer application can be a calculator, and for a paragraph of text, a computer application can be a word processing tool. The RCU can also be configured to narrow the scope of the identification based on user input, device data regarding a target device, or the session mode. For example, when the class schedule indicates that a mathematics class is being conducted in the classroom, the list of items can be limited to a formula and a paragraph of text; when the target device is currently running a specific computer application, the list of items can be limited to be what can be processed by the specific computer application. The RCU can be configured to then treat a computer application associated with an identified item as the active computer application and similarly determine whether a copy of the active computer application is installed or running on the target device, as discussed above.

In some embodiments, when the source data includes a generic computer object, the RCU is programmed to identify an item of a list of special items of interest from the source data, using existing image, text, or speech processing techniques. The list of special items can include undesirable items that are private in nature or match offensive, inappropriate, or irrelevant keywords and thus to be filtered. In response to identifying an undesirable item, the RCU can be configured to reject the content transfer and notify the user accordingly. The RCU can also be configured to obtain a user instruction using one of the input devices, such as a microphone or a touch screen, and generate a command to filter a computer object and include the command in the updated source data. For example, the user can speak "Delete the second paragraph" into the microphone, draw an "X" across the second paragraph presented in a touchscreen, or circle the first paragraph (thus discarding the second paragraph) presented in the touchscreen. The command can then include a filtering directive and the user instruction. The list of items can also include specific items to be transformed. In response to identifying a question, the RCU can be configured to find an answer from a knowledge database using existing national language processing techniques or obtain a user answer using one of the input devices, and generate a command to supplement a computer object and include the command in the updated source data. The command can include a supplement directive together and a corresponding answer. When the session mode is clarification, the source data may be the content displayed on a student's laptop that is then captured by the RCU, and the RCU can be programmed to generate a command to magnify a computer object and include the command in the updated source data.

In some embodiments, when the content transfer involves multiple source devices, the RCU can be programmed to communicate to a target device that computer objects from multiple source devices are to be combined using multiple commands to supplement a computer object, one for each additional computer object to combine. Alternatively, the RCU can be programmed to utilize a command to incorporate a computer object to an existing computer object already being operated on by a computer application instead of having the computer application operate on the computer object from scratch. Such a command can include an incorporation directive together with a certain computer object. The RCU can be programmed to then transmit multiple such commands corresponding to the multiple source devices. The command to incorporate a computer object can also be utilized when the transfer involves only one source device. When the session mode is collaboration or Q&A, the RCU can also be programmed to generate a command to combine multiple pieces of work from multiple student groups or to add an answer to a student's question.

5.5. Content Delivery and Integration

In some embodiments, the RCU is programmed to transmit the updated source data, which includes a computer object with relevant metadata and one or more commands, to a target device. As noted above, the commands can be for installing or running a computer application, filtering, supplementing, or magnifying a computer object, or processing or incorporating a computer object. The commands can be associated with different priorities and executed in the order of the priorities. The target device is programmed to receive the updated source data. Each content transfer can follow a specific protocol, such as communicating the content being transferred and the one or more commands in one or more network trips with the data for each trip in a specific format. Each command can be represented as a pair, where the first element indicates the type of the command and the second element indicates the arguments for the command. For example, for processing or incorporating a computer object, an argument would indicate the computer object with the relevant metadata, for filtering a computer object, an argument would indicate the portion to be filtered from the computer object; for supplementing the computer object, an argument would indicate the portion to be added to the computer object; for installing or running a computer supplication, an argument would indicate the computer application.

In some embodiments, a target device is programmed to process the updated source data. In response to a command to filter, supplement, or magnify a computer object provided in the updated source data or one already being operated on by a copy of a specified computer application, the target device is programmed to recognize the portion to be filtered or supplemented and perform the filtering, addition, or blow-up. When the computer object is a specific computer object, the target device can be programmed to make appropriate API calls to alter the computer object. For example, when a teacher would like to show, on a screen of a primary IOD, two poems from two students currently displayed on two screens of two secondary IODs for comparison, the received commands may include running a document processing tool, processing a first document including the first poem, and supplementing the first document with a second document including the second poem. The target device can be programmed to make corresponding API calls to the document processing tool to open the first document having the first poem paragraph, open the second document having the second poem paragraph, and merge the two paragraphs. For further example, when a teacher would like to show, on a large screen of an IOD, a comment from a student currently displayed on the screen of a personal laptop for open discussion, the received commands may include running a document processing tool, processing a document including the poem, which may include analyzing an image and performing optical character recognition, and showing the poem in a larger or bolder font. The target device can be programmed to make corresponding API calls to the document processing tool to open the document having the poem paragraph and adjust the font of the poem paragraph.

In some embodiments, when the computer application to handle a specific computer object being transferred is already running, the target device is programmed to assume that the specific computer object is to be integrated into an existing computer object already being operated on by the computer application even in the absence of a command to incorporate the computer object. For example, when a teacher would like to show, on a screen of an IOD on which a question is already displayed, an answer to the question from a student currently displayed on the screen of the student's laptop, the target device can be programmed to make appropriate API calls to the document processing tool, which has already opened the first document having the question paragraph, to open a second document having the answer paragraph, and merge the two paragraphs.

In some embodiments, when the computer object is a generic computer object, the target device can be programmed to process the commands using existing techniques for speech, text, or image processing. For example, when the filtering directive is accompanied by a spoken sentence of removing the second paragraph from a computer object or another image indicating a strike-through over the second paragraph or a circle around the first paragraph, the target device can be programmed to identify the second paragraph as the portion to be filtered out and automatically remove the second paragraph from the computer object.

In some embodiments, in response to a command to install or run a computer application, the target device is programmed to install or run the computer application as appropriate and have the computer application operate on a computer object in the updated source data, which can include importing the computer object into an appropriate format for further operation by the computer application. For example, the computer object may be an image generated from a capture of a screen or the surroundings, while the specified computer application is a word processing tool, which is expected to import the image and convert the image into a document of text, thereby converting a generic computer object to a specific computer object. When the installation or running of the computer application is unsuccessful, the target device can be programmed to find and apply a substitute computer application.

In some embodiments, in response to any failure to execute a command, such as failing to install or run an appropriate computer application or filter or supplement a computer object, the target device is programmed to send a notification to the RCU of such a failure or a reason for the failure. In response to a success of executing the commands, the target device can be programmed to also send an acknowledgement to the RCU.

In some embodiments, in response to receiving a notification of a failure from a target device, the RCU is programmed to select a substitute computer application or another target device that can handle the content transfer and restart the content transfer, or send a corresponding notification to a user device. The substitute computer application can be a standard tool for handling the image, audio, or video captured by the RCU or an IOD, for example. In response to receiving an acknowledgement from each target device, the RCU is programmed to clear any content for transfer in preparation for new content transfer requests.

6. Example Processes

Aspects of the illustrative embodiments are described herein with reference to flowchart illustrations. It will be understood that each block of the flowchart illustrations and combinations of blocks in the flowchart illustrations can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, implement the activities specified in the flowcharts.

The flowcharts and block diagrams in the figures illustrate the architecture, functionality, and operation of possible implementations of systems, methods, and computer readable storage media according to various embodiments. In this regard, each step in a flowchart may represent a module, segment, or portion of instructions, which comprises one or more executable instructions for implementing the specified logical functions. In some alternative implementations, the functions noted in a step can occur out of the order noted in the figures. For example, two steps shown in succession can, in fact, be executed substantially concurrently, or the blocks can sometimes be executed in the reverse order, depending upon the functionality involved.

Figure 8:
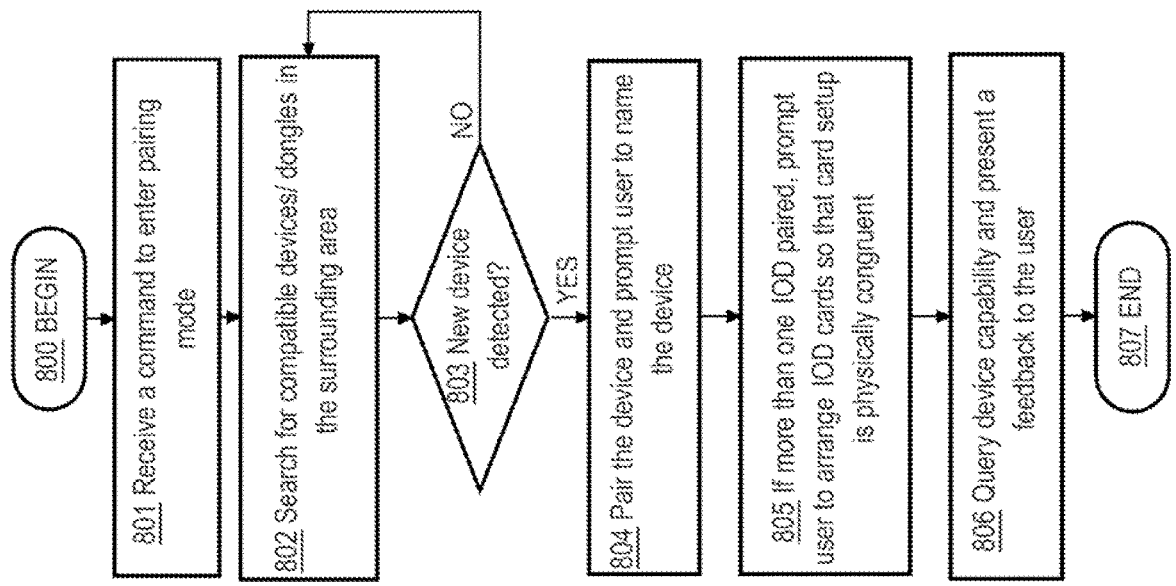
FIG. 8 is a flowchart illustrating operation of a remote-control unit for pairing with integrated output devices in accordance with an illustrative embodiment.

FIG. 8 is a flowchart illustrating operation of a remote-control unit for pairing with integrated output devices in accordance with an illustrative embodiment. Operation begins in step 800, and the user pushes a button on the RCU to put the RCU in pairing mode in step 801. The RCU is configured or programmed to search for compatible devices, such as IODs or dongles for controlling IODs, in the surrounding area in step 802. In one embodiment, the surrounding area is defined by a signal range of the wireless technology (e.g., the Bluetooth® short-range wireless technology standard) used for communicating between the RCU and the devices with which the RCU is being paired. The RCU is configured to determine whether a new device is detected in step 803. If a new device is not detected in the NO branch, then operation returns to step 802 to search for compatible devices until a new device is detected.

If a new device is detected in the YES branch, then the RCU is configured to pair with the device and prompt the user to name the device in step 804. In some embodiments, the device is a dongle for controlling an IOD. The user can name the device based on its association with the IOD. For example, if the dongle is coupled to a projector display device, then the user can name the dongle being paired as "Projector Display," as shown in FIG. 4.

If more than one IOD is paired, via more than one dongle, then the RCU is configured to prompt the user to arrange IOD cards on the interface of the RCU so that the card setup is physically congruent in step 805. That is, a user can rearrange the IOD user interface cards such that a IOD user interface card on the left corresponds to an IOD on the left side of the content presentation environment, an IOD user interface card in the center corresponds to an IOD in the center of the content presentation environment, and an IOD user interface card on the right corresponds to an IOD on the right side of the content presentation environment.

The RCU is configured to query the device capabilities and present feedback to the user in step 806. The device capabilities can be collected by the dongle, such as by identifying applications installed on the IOD. The user can use the device capability feedback to select an IOD for presenting content. For instance, if the user wishes to present a video, then the user can switch to an IOD card that indicates an IOD with a capability of displaying videos.

Thus, the user can switch from a smart speaker IOD card to a smart TV IOD card. Thereafter, operation ends in step 807.

Figure 9:
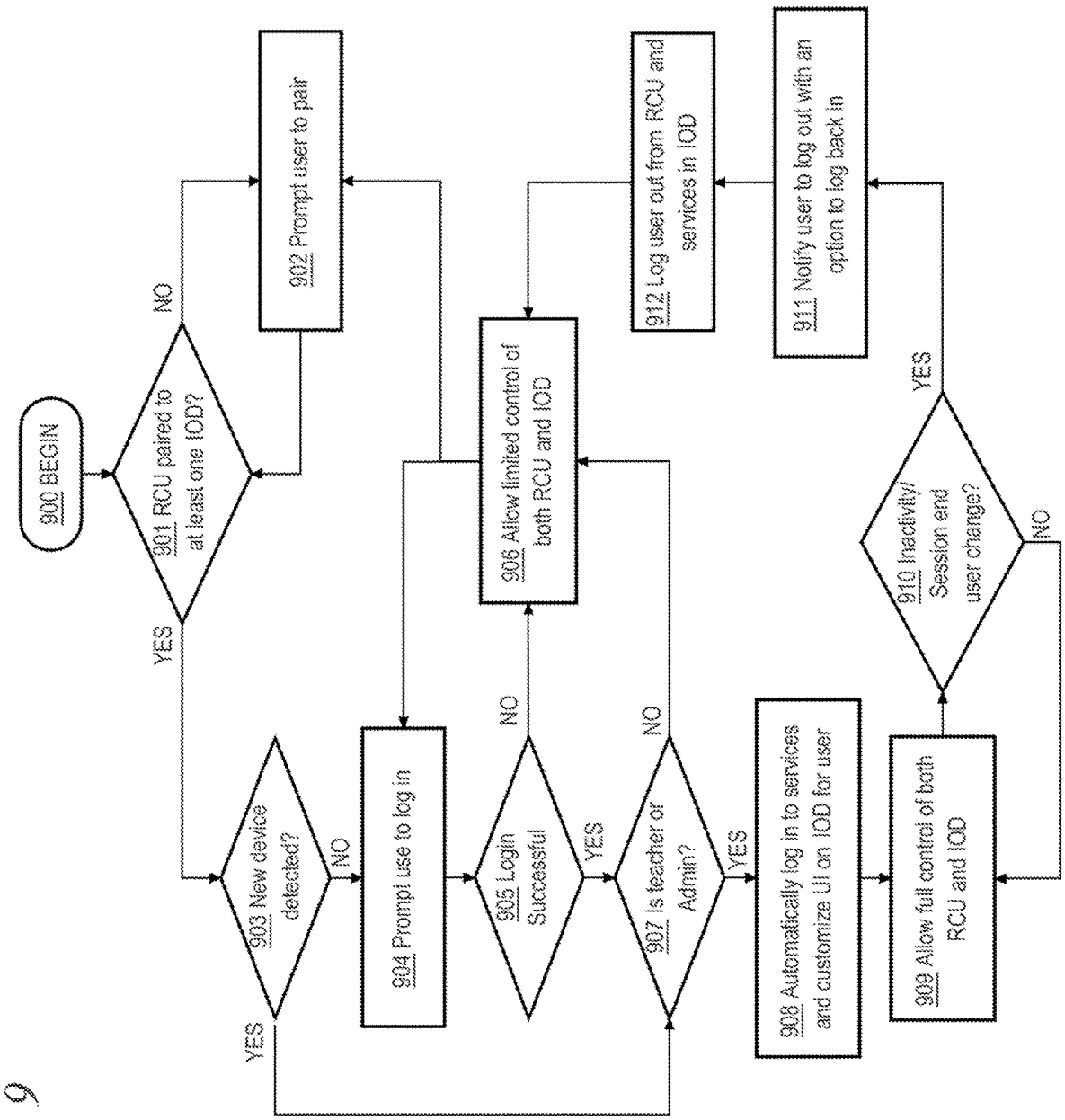
FIG. 9 is a flowchart illustrating operation of a remote-control unit for managing user control based on user role in accordance with an illustrative embodiment.

FIG. 9 is a flowchart illustrating operation of a remote-control unit for managing user control based on user role in accordance with an illustrative embodiment. Operation begins in step 900, and determination is made whether the RCU is paired to at least one IOD in step 901. If the RCU is not paired to at least one IOD in the NO branch of step 901, then the RCU is configured to prompt the user to pair with an IOD in step 902, and operation returns to step 801 until the RCU is paired to at least one IOD.

If the RCU is paired to at least one IOD in the YES branch of step 901, then a determination is made whether a user is logged in in step 903. If a user is not logged in the NO branch of step 903, then the RCU is configured to prompt the user to log in in step 904. A determination is made whether login of the user is successful in step 905. If login is not successful in the NO branch of step 905, then the RCU is configured to allow limited control of both the RCU and the IOD to the user in step 906. Operation returns to step 902 to prompt the user to pair a device responsive to the user selecting a pair new device option in the RCU. Operation returns to step 904 to prompt the user to log in responsive to the user selecting a login option in the RCU.

If the user is logged in in the YES branch of step 903 or login is successful in the YES branch of step 905, then a determination is made whether the user is a teacher or administrator in step 907. If the user is not a teacher or administrator in the NO branch of step 907, then operation returns to step 906 to allow limited control of both the RCU and the IOD. If the user is a teacher or administrator in the YES branch of step 907, then the RCU is configured to automatically log in to services and customize the user interface (UI) on the IOD for the user in step 908. The RCU is configured to allow full control of both the RCU and the IOD to the user in step 909. A determination is made whether there is a period of inactivity or the session has ended or the user logged into the RCU has changed in step 910. If there is no inactivity/session end/user change detected in the NO branch of step 910, then operation returns to step 909 to allow full control of the RCU and IOD.

If there is inactivity/session end/user change detected in the YES branch of step 910, then the RCU is configured to notify the user to log out with an option to log back in in step 911. The RCU is configured to log the user out from the RCU and the services on the IOD in step 912. Then, operation returns to step 906 to allow limited control of the RCU and IOD.

Figure 10:
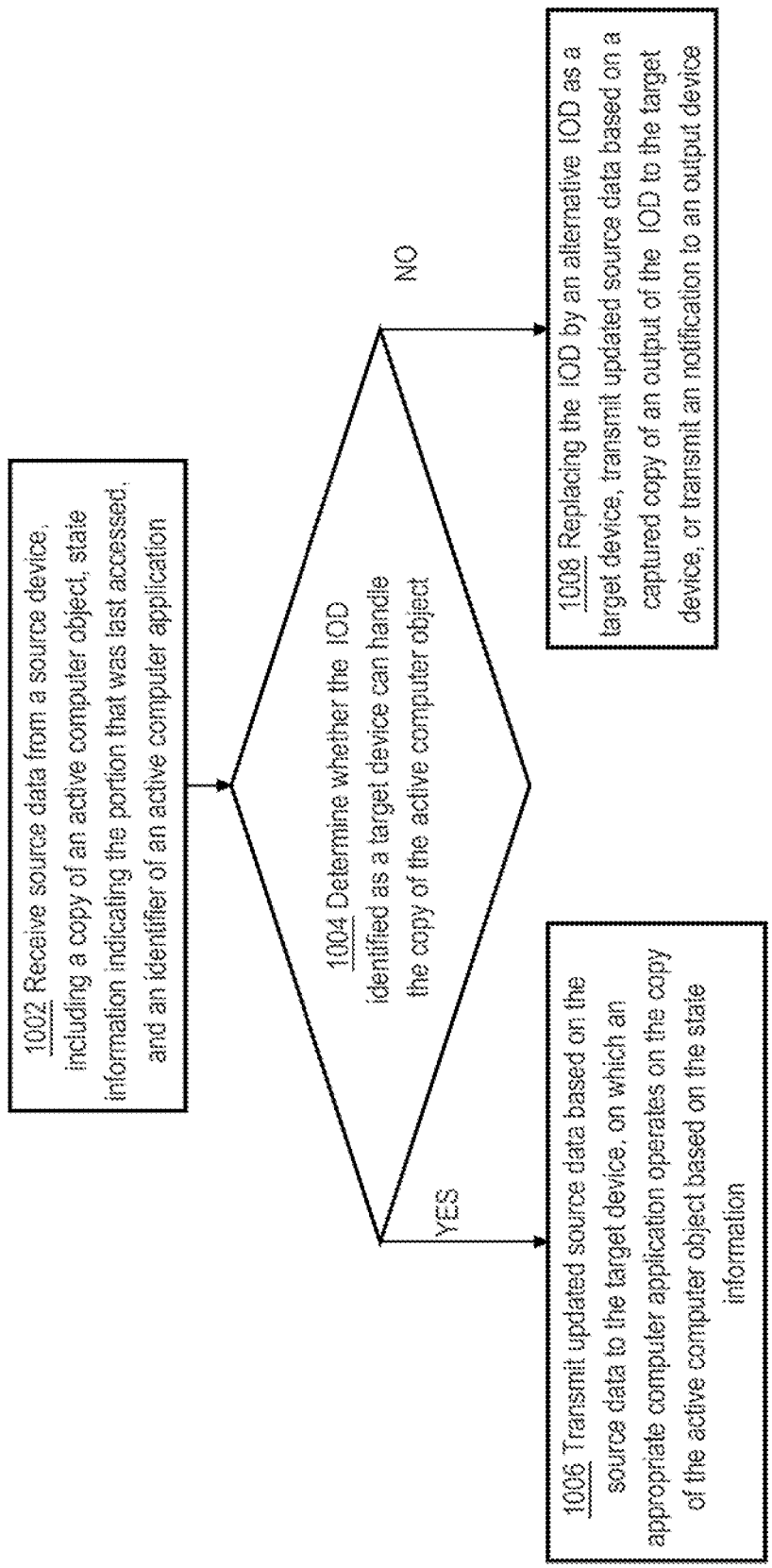
FIG. 10 is a flowchart illustrating an example process of identifying a target device and transmitting updated source data to the target device.

FIG. 10 is a flowchart illustrating an example process of identifying a target device and transmitting updated source data to the target device. In step 1002, an RCU is programmed to receive source data from a first IOD identified as a source device. For example, the "transfer" button of the RCU may have been pushed while the RCU is pointing at the first IOD. The source data can include a copy of an active computer object, state information indicating the portion of the computer object that was last accessed, and an identifier of an active computer application. In one example, the active computer application can be a web browser, the active computer object can be a webpage, and the state information can indicate which portion of the webpage was last displayed in the window of the web browser.

In step 1004, the RCU is programmed to determine whether a second IOD identified as a target device can handle the copy of the active computer object. For example, the "transfer" button may have been released when the RCU is pointing at the second IOD. The second IOD may not be able to handle the copy of the active computer object because the second IOD is not responding or does not have sufficient computer resources to run the active computer application, for example.

In step 1006, upon determining that the second IOD can handle the copy of the active computer object, the RCU is programmed to transmit, to the second IOD, updated source data that includes the copy of the active computer object, the state information, and a command to run the web browser or another suitable computer application. The second IOD is programmed to receive the updated source data and have an appropriate computer application operate on the copy of the copy of the active computer object. In the same example noted above, the same portion of that webpage that was last displayed in the window of the web browser on the first IOD can again be displayed in a window of a web browser on the second IOD.

In step 1008, upon determining that the second IOD cannot handle the copy of the active computer object, the RCU is programmed to select an alternative IOD which can handle the copy of the active computer object as the target device and transmit the updated source data to the alternative IOD. When an alternative IOD cannot be found, the RCU can be programmed to replace the copy of the active computer object in the updated source data by a captured copy of an output of the first IOD and transmit the updated source data to the second IOD. The second IOD is programmed to receive the updated source data and have a default computer application operate on the captured copy of the output of the first IOD. The RCU can also be programmed to send a notification to an output device indicating that an alternative IOD has been selected as the target device for the content transfer or that the content transfer from the first IOD is unsuccessful.

Figure 11:
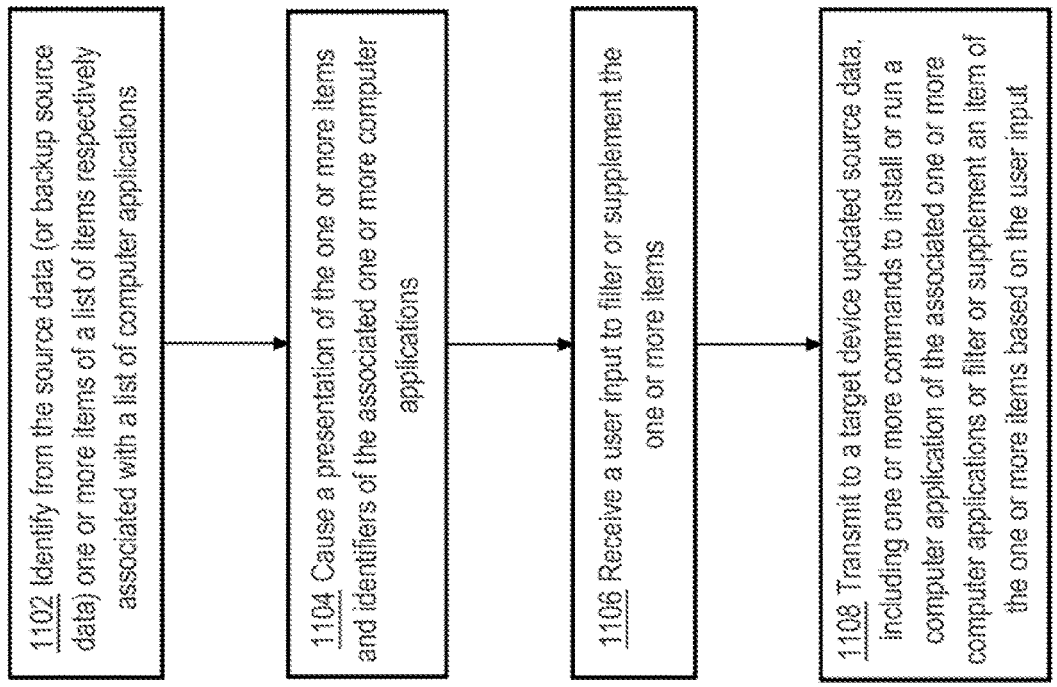
FIG. 11 is a flowchart illustrating an example process of determining the content to be transferred based on user input.

FIG. 11 is a flowchart illustrating an example process of determining the content to be transferred based on user input. In step 1102, an RCU is programmed to identify from the source data (or backup source data) one or more items of a list of items respectively associated with a list of computer applications. For example, the list of items can include a formula, a paragraph of text, and a song, and the associated list of computer applications can include a calculator, a word processing tool, and a music player. When the source data can be handled by a default computer application running on the RCU or when the backup source data is available, the RCU can be configured to identify the one or more items using existing techniques for analyzing images, speech, or text. For example, the source data may include a copy of an active computer object, but the backup source data can include a screen capture of the active computer object. The backup source data can then be used to identify the one or more list of items and generate appropriate commands to filter or supplement the copy of the active computer object, and the target device can be configured to execute the command on the copy of the active computer object.

In step 1104, the RCU is programmed to cause a presentation of the one or more items and identifiers of the associated one or more computer applications on an output mechanism of the RCU, such as a touch screen, for a user review. For example, the one or more items can include two paragraphs of text and a formula. While the one or more items are presented as images or other generic computer objects, the identifiers of the associated one or more computer applications inform the user of how the one or more items are to be handled as specific computer objects on the target device.

In step 1106, the RCU is programmed to receive a user input to filter or supplement the one or more items. For example, the user can eliminate or update one of the identified items from the content transfer or add an item to the content transfer using the same touch screen, which also serves as an input mechanism of the RCU, or a recorder, which is another input mechanism of the RCU.

In step 1108, the RCU is programmed to transmit, to a target device, updated source data that includes one or more commands to install or run a computer application of the associated one or more computer applications or filter or supplement an item of the one or more items based on the user input. For example, when the user selects one paragraph from the two paragraphs, the image containing both paragraphs can be included in the updated source data as a computer object together with a command to filter the non-selected paragraph. For further example, when the user adds an answer to a question paragraph in a document, a copy of the document can be included in the updated source data together with a command to supplement the document with the answer.

Figure 12:
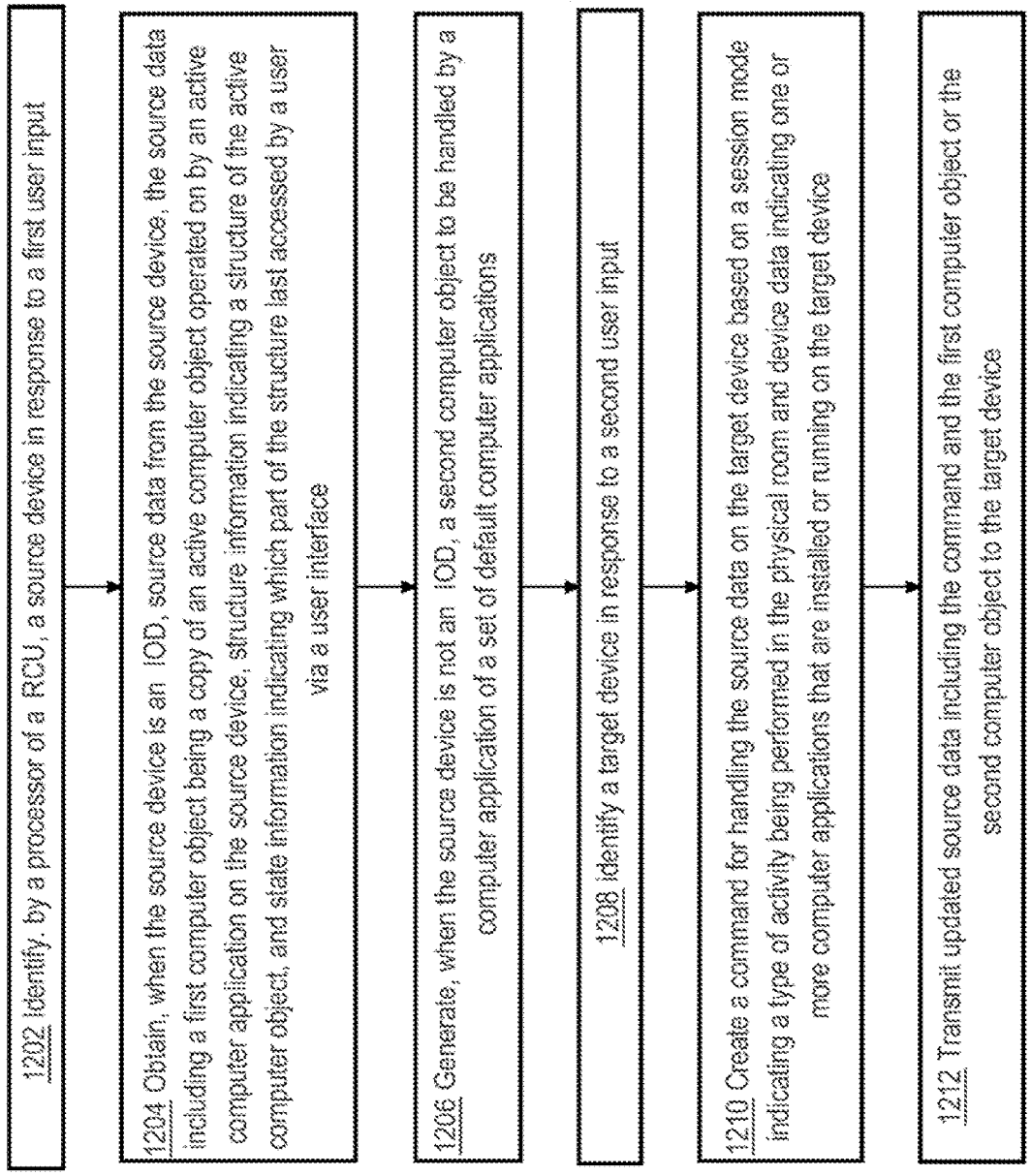
FIG. 12 is a flowchart illustrating an example process of controlling and effecting a content transfer in a physical room.

FIG. 12 is a flowchart illustrating an example process of controlling and effecting a content transfer in a physical room.

In step 1202, the RCU is programmed to identify a source device in response to a first user input.

In step 1204, the RCU is programmed to obtain, when the source device is an IOD, source data from the source device. The source data includes a first computer object being a copy of an active computer object operated on by an active computer application on the source device, structure information indicating a structure of the active computer object, and state information indicating which part of the structure last accessed by a user via a user interface.

In some embodiments, the RCU is further programmed to obtain, when the source device is an IOD, backup source data including a third computer object being a capture of an output of the IOD.

In step 1206, the RCU is programmed to generate, when the source device is not an IOD, a second computer object to be handled by a computer application of a set of default computer applications.

In step 1208, the RCU is programmed to identify a target device in response to a second user input.

In some embodiments, the first user input includes engaging a user interface element of the RCU when the RCU is in a first physical state. The second user input includes releasing the user interface element when the RCU is in a second first physical state different from the first physical state.

In step 1210, the RCU is programmed to create a command for handling the source data on the target device based on a session mode indicating a type of activity being performed in the physical room and device data indicating one or more computer applications that are installed or running on the target device.

In some embodiments, the session mode is Q&A, collaboration, or clarification. Q&A involves a user of the RCU answering questions from individuals in the physical room, collaboration involving the user waiting for the individuals working in groups in the physical room, and clarification involving the user discussing work by an individual in the physical room. In certain embodiments, the RCU is further programmed to determine the session mode based on a current position of a user of the RCU, where Q&A corresponds to the user being in a front and center of the physical room, collaboration corresponds to the user being in a front and side of the physical room, and clarification corresponds to the user being in an area other than the front of the physical room. In other embodiments, the command for handling the source data is for supplementing a computer object in the source data or incorporating the computer object into an existing computer object on the target device when the session mode is Q&A or collaboration, and the command for handling the source data is for magnifying a computer object in the source data when the session mode is clarification.

In some embodiments, the first user input includes selecting a first user interface element of the RCU. Identifying the source device comprises interpreting a subsequent user input or a capture of surroundings or calculating a position and orientation of the RCU. The second user input includes selecting a second user interface element of the RCU different from the first user interface element after selecting the first user interface element. In certain embodiments, generating the second computer object comprises taking the capture of surroundings or a portion thereof as the second computer object. In other embodiments, generating the second computer object comprises identifying a certain item of a list of items respectively associated with a list of computer applications from the capture, where the command for handling the source data is for running a certain computer application associated with the certain item.

In some embodiments, the RCU is programmed to cause a presentation of the first computer object or the second computer object via a user interface. The RCU is configured to then receive a user instruction to filter or supplement the first computer object or the second computer object. Creating a command for handling the source data then comprises generating a command further based on the user instruction.

In some embodiments, the RCU is programmed to receive updated device data from a certain IOD in the physical room. The RCU is configured to then identify the target device comprising recognizing the certain IOD as the target device. Next, the RCU is configured to determine that no copy of the active computer application is installed or running on the target device based on the updated device data. The command for handling the source data is then for installing or running a copy of the active computer application on the target device.

In step 1212, the RCU is programmed to transmit updated source data including the command and the first computer object or the second computer object to the target device.

In some embodiments, the RCU is programmed to receive updated device data periodically from each IOD of a plurality of IODs in the physical room. The RCU is configured to then receive a notification of a failure from a first IOD as the target device, select a second IOD of the plurality IODs different from the first IOD based on the updated device data from the second IOD; and transmit the updated source data to the second IOD.

7. Hardware Implementation

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
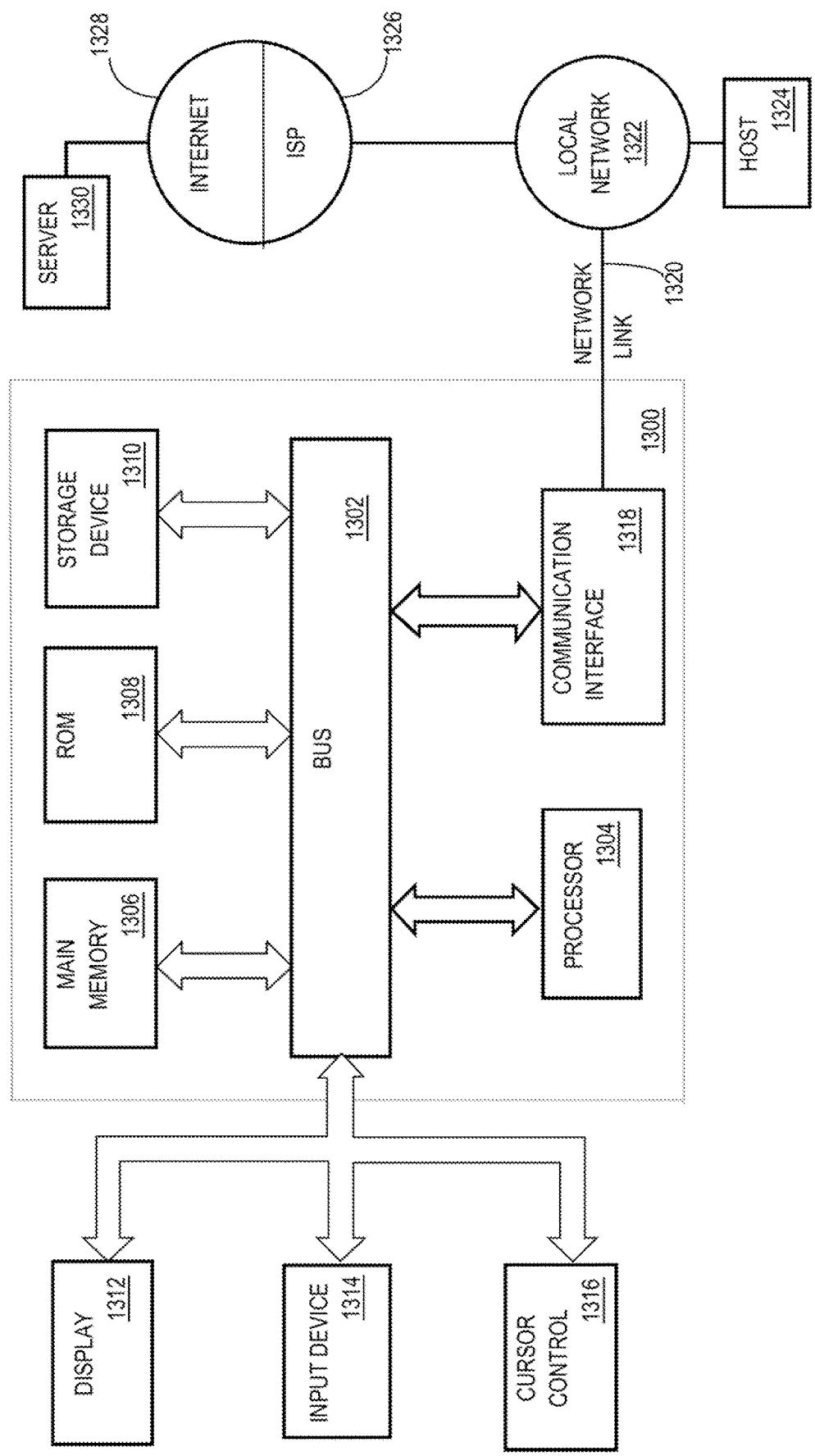
FIG. 13 is a block diagram that illustrates a computer system upon which an embodiment of the invention may be implemented.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general-purpose microprocessor.

Computer system 1300 also includes a main memory 1306, such as a random-access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or solid-state drive is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the worldwide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

8. Extensions and Alternatives

In other embodiments, the RCU is programmed to use machine learning models to interpret sensor data. For example, a machine learning model can be trained based on a training data set including user inputs by known users. The machine learning model can be trained to distinguish between user interactions with the RCU by teachers versus user interactions with the RCU by students. Thus, the RCU can be programmed to identify the user of the RCU based on how the RCU is being used. Furthermore, machine learning models can be trained for particular user interactions. For instance, a machine learning model can be trained to detect a thrust versus a wave or a throw versus a roll based on a combination of sensor inputs, such as motion sensors, camera, microphone, and pressure sensors, for example.

In other embodiments, a machine learning model can be trained to learn and predict what action a user intends to perform based on the sensor data. Thus, a user can perform interactions with the RCU to cause particular operations to be performed. The machine learning model then learns which sets of sensor data correlate to which operations the user intends to perform. The machine learning model can be trained for individual users or groups of users. For example, a machine learning model can learn what user interactions teachers tend to perform to select an object on a screen and another machine learning model can learn what user interactions students tend to perform to select an object on a screen.

In some embodiments, the RCU is customizable such that a user can decide which actions can be performed in each use mode and which user interactions with the RCU are mapped to each action. For example, one user may prefer to squeeze the RCU to select an object on the screen, and another user may prefer to bounce the RCU to select an object on the screen.

In the foregoing specification, embodiments of the invention have been described with reference to numerous specific details that can vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of controlling and effecting a content transfer in a physical room by a remote-control unit (RCU), comprising:
   identifying a source device being an integrated output device (IOD) in the physical room in response to a first user input;
   obtaining, in response to the identifying, source data from the source device, the source data including a first computer object being a copy of an active computer object operated on by an active computer application on the source device, structure information indicating a structure of the active computer object, and state information indicating which part of the structure is last accessed by a user via a user interface associated with the active computer application;

identifying a target device in the physical room in response to a second user input;

determining that no copy of the active computer application is installed or running on the target device based on device data indicating one or more computer applications that are installed or running on the target device;

creating a command for handling the source data on the target device based on a session mode of a plurality of session modes and the determining, each session mode indicating a type of group activity being performed by users in the physical room and leading to a unique command, the command indicating installing or running a copy of the active computer application on the target device;

transmitting updated source data including the command and the first computer object to the target device;

receiving updated device data periodically from each IOD of a plurality of IODs in the physical room;

receiving a notification of a failure from the target device;

selecting a second IOD of the plurality of IODs different from the target device based on the updated device data from the second IOD;

transmitting the updated source data to the second IOD, wherein the method is performed by one or more processors of the RCU in real time.

2. The computer-implemented method of claim 1, the first user input including engaging a user interface element of the RCU when the RCU is in a first physical state, the second user input including releasing the user interface element when the RCU is in a second first physical state different from the first physical state.

3. The computer-implemented method of claim 1, the session mode being question and answer (Q&A), collaboration, or clarification, Q&A involving a user of the RCU answering questions from individuals in the physical room, collaboration involving the user waiting for the individuals working in groups in the physical room, clarification involving the user discussing work by an individual in the physical room.

4. The computer-implemented method of claim 3, further comprising determining the session mode based on a current position of a user of the RCU, Q&A corresponding to the user being in a front and center of the physical room, collaboration corresponding to the user being in a front and side of the physical room, clarification corresponding to the user being in an area other than the front of the physical room.

5. The computer-implemented method of claim 3, the command being for supplementing a computer object in the source data or incorporating the computer object into an existing computer object on the target device when the session mode is Q&A or collaboration, the command being for magnifying a computer object in the source data when the session mode is clarification.

6. The computer-implemented method of claim 1, further comprising obtaining, when the source device is an IOD, backup source data including a third computer object being a capture of an output of the IOD.

7. The computer-implemented method of claim 1, further comprising:

causing a presentation of the first computer object via a specific user interface;

receiving a user instruction to filter or supplement the first computer object, the creating comprising generating the command further based on the user instruction.

8. The computer-implemented method of claim 1, further comprising:

identifying a second source device not being an IOD in the physical room in response to a third user input;

generating as second source data a second computer object to be handled by a computer application of a set of default computer applications;

identifying a second target device in the physical room in response to a fourth user input;

creating a second command for handling the second source data on the second target device based on the session mode and the device data;

transmitting second updated source data including the second command and the second computer object to the second target device.

9. The computer-implemented method of claim 8, the third user input including selecting a first user interface element of the RCU, identifying the second source device comprising interpreting a subsequent user input or a capture of surroundings or calculating a position and orientation of the RCU, the fourth user input including selecting a second user interface element of the RCU different from the first user interface element after selecting the first user interface element.

10. The computer-implemented method of claim 9, the generating comprising taking the capture of surroundings or a portion thereof as the second computer object.

11. The computer-implemented method of claim 9, the generating further comprising identifying a certain item of a list of items respectively associated with a list of computer applications from the capture, the command being for running a certain computer application associated with the certain item.

12. One or more non-transitory storage media storing instructions which, when executed by one or more computing devices, cause performance of a method of controlling and effecting a content transfer in a physical room by a remote-control unit (RCU), the method comprising:

identifying a source device being an integrated output device (IOD) in the physical room in response to a first user input;

obtaining, in response to the identifying, source data from the source device, the source data including a first computer object being a copy of an active computer object operated on by an active computer application on the source device, structure information indicating a structure of the active computer object, and state information indicating which part of the structure is last accessed by a user via a user interface associated with the active computer application;

identifying a target device in the physical room in response to a second user input;

determining that no copy of the active computer application is installed or running on the target device based on device data indicating one or more computer applications that are installed or running on the target device;

creating a command for handling the source data on the target device based on a session mode of a plurality of session modes and the determining, each session mode indicating a type of group activity being performed by users in the physical room and leading to a unique command, the command indicating installing or running a copy of the active computer application on the target device;

transmitting updated source data including the command and the first computer object to the target device;

receiving updated device data periodically from each IOD of a plurality of IODs in the physical room;

receiving a notification of a failure from the target device;

selecting a second IOD of the plurality of IODs different from the target device based on the updated device data from the second IOD;

transmitting the updated source data to the second IOD, wherein the method is performed by one or more processors of the RCU in real time.

13. The one or more non-transitory storage media of claim 12, the first user input including engaging a user interface element of the RCU when the RCU is in a first physical state, the second user input including releasing the user interface element when the RCU is in a second first physical state different from the first physical state.

14. The one or more non-transitory storage media of claim 12, the session mode being Q&A, collaboration, or clarification, Q&A involving a user of the RCU answering questions from individuals in the physical room, collaboration involving the user waiting for the individuals working in groups in the physical room, clarification involving the user discussing work by an individual in the physical room.

15. The one or more non-transitory storage media of claim 14, the method further comprising determining the session mode based on a current position of a user of the RCU, Q&A corresponding to the user being in a front and center of the physical room, collaboration corresponding to the user being in a front and side of the physical room, clarification corresponding to the user being in an area other than the front of the physical room.

16. The one or more non-transitory storage media of claim 14, the command being for supplementing a computer object in the source data or incorporating the computer object into an existing computer object on the target device when the session mode is Q&A or collaboration, the command being for magnifying a computer object in the source data when the session mode is clarification.

17. The one or more non-transitory storage media of claim 12, the method further comprising:

identifying a second source device not being an IOD in the physical room in response to a third user input;

generating as second source data a second computer object to be handled by a computer application of a set of default computer applications;

identifying a second target device in the physical room in response to a fourth user input;

creating a second command for handling the second source data on the second target device based on the session mode and the device data;

transmitting second updated source data including the second command and the second computer object to the second target device.

18. The one or more non-transitory storage media of 22, the third user input including selecting a first user interface element of the RCU, identifying the second source device comprising interpreting a subsequent user input or a capture of surroundings or calculating a position and orientation of the RCU, the fourth user input including selecting a second user interface element of the RCU different from the first user interface element after selecting the first user interface element.

19. The one or more non-transitory storage media of claim 18, the generating comprising taking the capture of surroundings or a portion thereof as the second computer object.

20. A remote-control unit for controlling and effecting a content transfer in a physical room, comprising:

a memory;

one or more processors coupled to the memory and configured to perform:

identifying a source device being an integrated output device (IOD) in the physical room in response to a first user input;

obtaining, in response to the identifying, source data from the source device, the source data including a first computer object being a copy of an active computer object operated on by an active computer application on the source device, structure information indicating a structure of the active computer object, and state information indicating which part of the structure is last accessed by a user via a user interface associated with the active computer application;

identifying a target device in the physical room in response to a second user input;

determining that no copy of the active computer application is installed or running on the target device based on device data indicating one or more computer applications that are installed or running on the target device;

creating a command for handling the source data on the target device based on a session mode of a plurality of session modes and the determining, each session mode indicating a type of group activity being performed by users in the physical room and leading to a unique command, the command indicating installing or running a copy of the active computer application on the target device;

transmitting updated source data including the command and the first computer object to the target device;

receiving updated device data periodically from each IOD of a plurality of IODs in the physical room;

receiving a notification of a failure from the target device;

selecting a second IOD of the plurality of IODs different from the target device based on the updated device data from the second IOD;

transmitting the updated source data to the second IOD, wherein one or more of the steps are performed by the one or more processors in real time.

* * * * *